(12) United States Patent
Hokuto et al.

(10) Patent No.: US 12,204,360 B2
(45) Date of Patent: Jan. 21, 2025

(54) PEDAL DEVICE

(71) Applicant: DENSO CORPORATION, Kariya (JP)

(72) Inventors: Daisuke Hokuto, Kariya (JP); Etsugo Yanagida, Kariya (JP); Kengo Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/454,647

(22) Filed: Aug. 23, 2023

(65) Prior Publication Data

US 2023/0393605 A1     Dec. 7, 2023

Related U.S. Application Data

(63) Continuation of application No. PCT/JP2022/005057, filed on Feb. 9, 2022.

(30) Foreign Application Priority Data

Feb. 25, 2021   (JP) ................ 2021-029097

(51) Int. Cl.
*G05G 1/38* (2008.04)
*B60T 7/04* (2006.01)
(Continued)

(52) U.S. Cl.
CPC ............... *G05G 1/38* (2013.01); *B60T 7/042* (2013.01); *G05G 1/44* (2013.01); *B60K 26/02* (2013.01); *B60T 7/06* (2013.01); *B60T 8/17* (2013.01)

(58) Field of Classification Search
None
See application file for complete search history.

(56) References Cited

U.S. PATENT DOCUMENTS

2010/0263469 A1   10/2010  Ohtsubo et al.
2018/0253120 A1    9/2018  Kim et al.
(Continued)

FOREIGN PATENT DOCUMENTS

JP      S5453216 U     4/1979
JP      62-166522      10/1987
(Continued)

OTHER PUBLICATIONS

U.S. Appl. No. 18/454,564 to Hokuto et al., filed Aug. 23, 2023 (62 pages).
(Continued)

*Primary Examiner* — Vicky A Johnson
(74) *Attorney, Agent, or Firm* — Nixon & Vanderhye P.C.

(57) ABSTRACT

A pedal pad includes a plate portion having a plate shape extending in a pedal extending direction and having a thickness in a plate thickness direction, and the pedal pad is rotatably movable about a pedal shaft center that is perpendicular to the pedal extending direction by a step-on operation of a driver to the plate portion from one side in the plate thickness direction. The plate portion has one end portion in the pedal extending direction positioned lower in the vehicle than an another end portion in the pedal extending direction in a non-stepping state in which the driver is not performing the step-on operation on the pedal pad. Furthermore, the one end portion of the plate shape of the plate portion extends in the pedal extending direction, more than a position of the pedal shaft.

19 Claims, 26 Drawing Sheets

(51) Int. Cl.
  *G05G 1/44* (2008.04)
  *B60K 26/02* (2006.01)
  *B60T 7/06* (2006.01)
  *B60T 8/17* (2006.01)

(56) References Cited

U.S. PATENT DOCUMENTS

2019/0163227 A1* 5/2019 Kadoi .................... G05G 5/05
2021/0300180 A1   9/2021 Kihara et al.

FOREIGN PATENT DOCUMENTS

| | | |
|---|---|---|
| JP | 5-32201 | 4/1993 |
| JP | 11-278090 | 10/1999 |
| JP | 2002-286498 | 10/2002 |
| JP | 2002-358131 | 12/2002 |
| JP | 2011060099 A | 3/2011 |
| JP | 2012-224213 | 11/2012 |
| JP | 2015-81023 | 4/2015 |
| JP | 2016-55856 | 4/2016 |
| JP | 2017049892 A | 3/2017 |
| JP | 2019-67005 | 4/2019 |
| WO | 2022181327 A1 | 9/2022 |
| WO | 2022181328 A1 | 9/2022 |
| WO | 2022181329 A1 | 9/2022 |

OTHER PUBLICATIONS

U.S. Appl. No. 18/454,630 to Yamamoto et al., filed Aug. 23, 2023 (42 pages).

* cited by examiner

12,204,360 B2

PEDAL DEVICE

CROSS REFERENCE TO RELATED APPLICATION

The present application is a continuation application of International Patent Application No. PCT/JP2022/005057 filed on Feb. 9, 2022, which designated the U.S. and claims the benefit of priority from Japanese Patent Application No. 2021-029097 filed on Feb. 25, 2021. The entire disclosures of all of the above applications are incorporated herein by reference.

TECHNICAL FIELD

The present disclosure relates to an organ-type pedal device provided in a vehicle.

BACKGROUND

Conventionally, an organ-type pedal device is known which is used as, for example, an accelerator pedal device or a brake pedal device in a vehicle. In the organ-type pedal device, a pedal shaft is required to have sufficient rigidity because the pedal shaft receives the pedaling force of a driver when the driver performs a step-on operation with the pedal pad.

SUMMARY

According to one aspect of the present disclosure, an organ-type pedal device to be mounted on a vehicle includes a pedal pad including a plate portion having a plate shape extending in a pedal extending direction and having a thickness in a plate thickness direction. The plate portion has one end portion in a pedal extending direction positioned lower in the vehicle than an another end portion in the pedal extending direction in a non-stepping state in which a driver is not performing a step-on operation on the pedal pad. Furthermore, the one end portion of the plate shape of the plate portion extends in the pedal extending direction, more than a position of a pedal shaft. That is, the one end portion of the plate shape of the plate portion extends over the position of the pedal shaft in the pedal extending direction.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
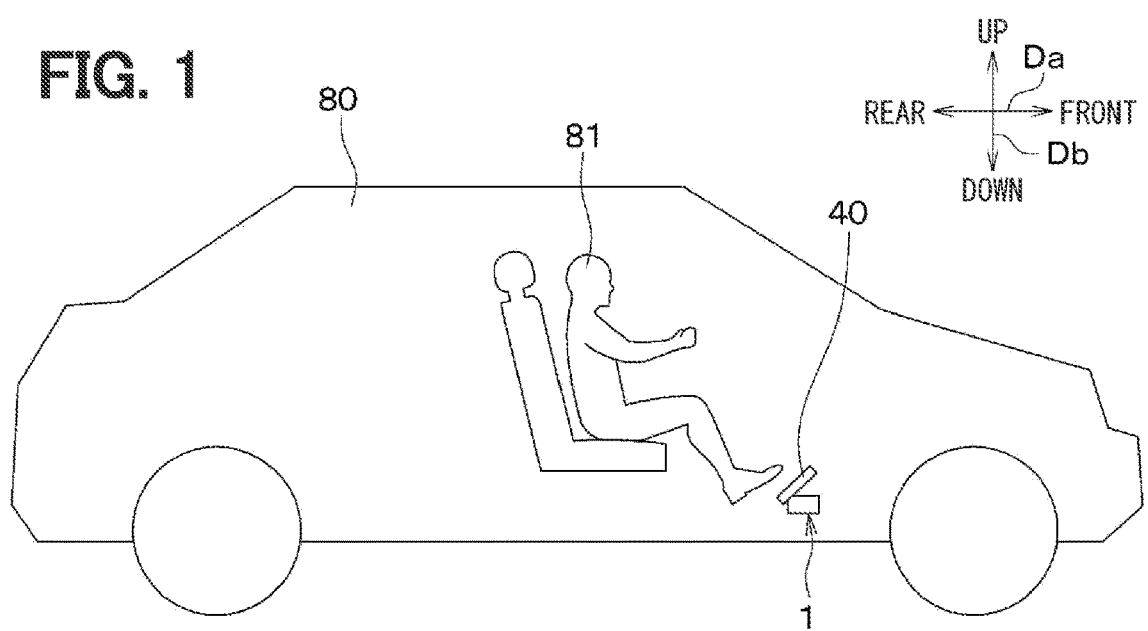
FIG. 1 is a schematic diagram of a vehicle equipped with a pedal device according to a first embodiment.

In an organ-type pedal device, a stepped portion of a pedal pad, stepped on by the driver, is arranged above a pedal shaft center in the vehicle, which serves as the center of rotation of the pedal pad. The organ-type pedal device is used as, for example, an accelerator pedal device or a brake pedal device in a vehicle. The organ-type pedal device includes a housing, a pedal pad that rotates about the pedal shaft center with respect to the housing, and a connecting link that connects the pedal pad to a reaction force mechanism provided in the housing.

The pedal pad includes a plate portion extending obliquely or diagonally up and down in the vehicle, and a connecting portion rotatably connected to the housing. The connecting portion is provided to partially protrude from an end surface of the plate portion, which is a lower end of a plate shape of the plate portion in the vehicle. Further, the pedal shaft center in the pedal device is provided at a position that coincides with the center of thickness of the plate shape measured in a plate thickness direction of the plate portion.

In the organ-type pedal system, for example, the pedal pad may be connected to the housing via a pedal shaft to rotatably connect the pedal pad to the housing. In such case, the pedal shaft is required to have sufficient rigidity because the pedal shaft receives the pedaling force of the driver when the driver performs a step-on operation with the pedal pad.

In order to ensure sufficient rigidity of the pedal shaft, if the diameter of the pedal shaft is set to be sufficiently large, a shape of the pedal pad has to have a protrusion toward the driver facing the pedal pad. In such case, an obstacle that can interfere with the foot of the driver stepping on the pedal pad may be formed on the driver's side surface of the pedal pad, thereby deteriorating the operability of the pedal device. These issues are studied by the inventors of the present disclosure.

It is an object of the present disclosure to increase rigidity of a pedal shaft in an organ-type pedal device while appropriately ensuring operability of the pedal device.

According to one aspect of the present disclosure, an organ-type pedal device to be mounted on a vehicle includes: a pedal pad including a plate portion having a plate shape extending in a pedal extending direction and having a thickness in a plate thickness direction, wherein the pedal pad is rotatably movable about a pedal shaft center that is perpendicular to the pedal extending direction by a step-on operation of a driver to the plate portion from one side in the plate thickness direction; a pedal shaft extending in an axial direction of the pedal shaft center; and a support body rotatably supporting the pedal pad via the pedal shaft for a rotation of the pedal pad about the pedal shaft center. The pedal shaft center is shifted away from a center of a plate thickness of the plate portion toward the other side in the plate thickness direction, and the other side is an opposite to the one side in the plate thickness direction. The plate portion has one end portion in the pedal extending direction positioned lower in the vehicle than an another end portion in the pedal extending direction in a non-stepping state in which the driver is not performing the step-on operation on the pedal pad. Furthermore, the one end portion of the plate shape of the plate portion extends in the pedal extending direction, more than a position of the pedal shaft.

Thus, it is possible for the pedal shaft to have a greater diameter without forming an interfering object on a driver's side of the pedal pad, as compared with a structure of the pedal device of Patent Document 1. Therefore, the rigidity of the pedal shaft can be increased while appropriately ensuring the operation performance of the pedal device.

Further, the plate shape of the plate portion in the pedal pad extends toward the side of the one end portion in the pedal extending direction more than the pedal shaft, thereby protecting the pedal shaft and its proximity around the pedal shaft from the foot of the driver stepping on the pedal pad.

Hereinafter, the embodiments will be described with reference to the drawings. In each of the following embodiments, the same or equivalent parts are denoted by the same reference numerals in the drawings.

First Embodiment

As shown in FIG. 1, a pedal device 1 of the present embodiment is mounted on a vehicle 80 and is stepped on by a driver 81 who is a passenger of the vehicle 80 with a pedaling force thereof. The pedal device 1 is provided in the vehicle 80 as a brake pedal device for performing a braking operation for braking the vehicle 80.

The double-headed arrows in FIG. 1 respectively indicate a direction of the vehicle 80 on which the pedal device 1 is mounted. That is, in FIG. 1, a vehicle front-rear direction Da, which is the front-rear direction of the vehicle 80, and a vehicle up-down direction Db, which is the vertical direction of the vehicle 80 (in other words, the vertical direction of the vehicle 80), are indicated by the double-headed arrows. In the description of the present embodiment, the front in the vehicle front-rear direction Da is also referred to as a vehicle front, the rear in the vehicle front-rear direction Da is also referred to as a vehicle rear, and the upside in the vehicle vertical direction Db is also referred to as a vehicle upside, the down side in the vehicle vertical direction Db is also referred to as a vehicle downside.

The vehicle 80 of the present embodiment employs a brake-by-wire system 84, specifically, and the pedal device 1 is a brake pedal device used in the brake-by-wire system 84.

Figure 2:
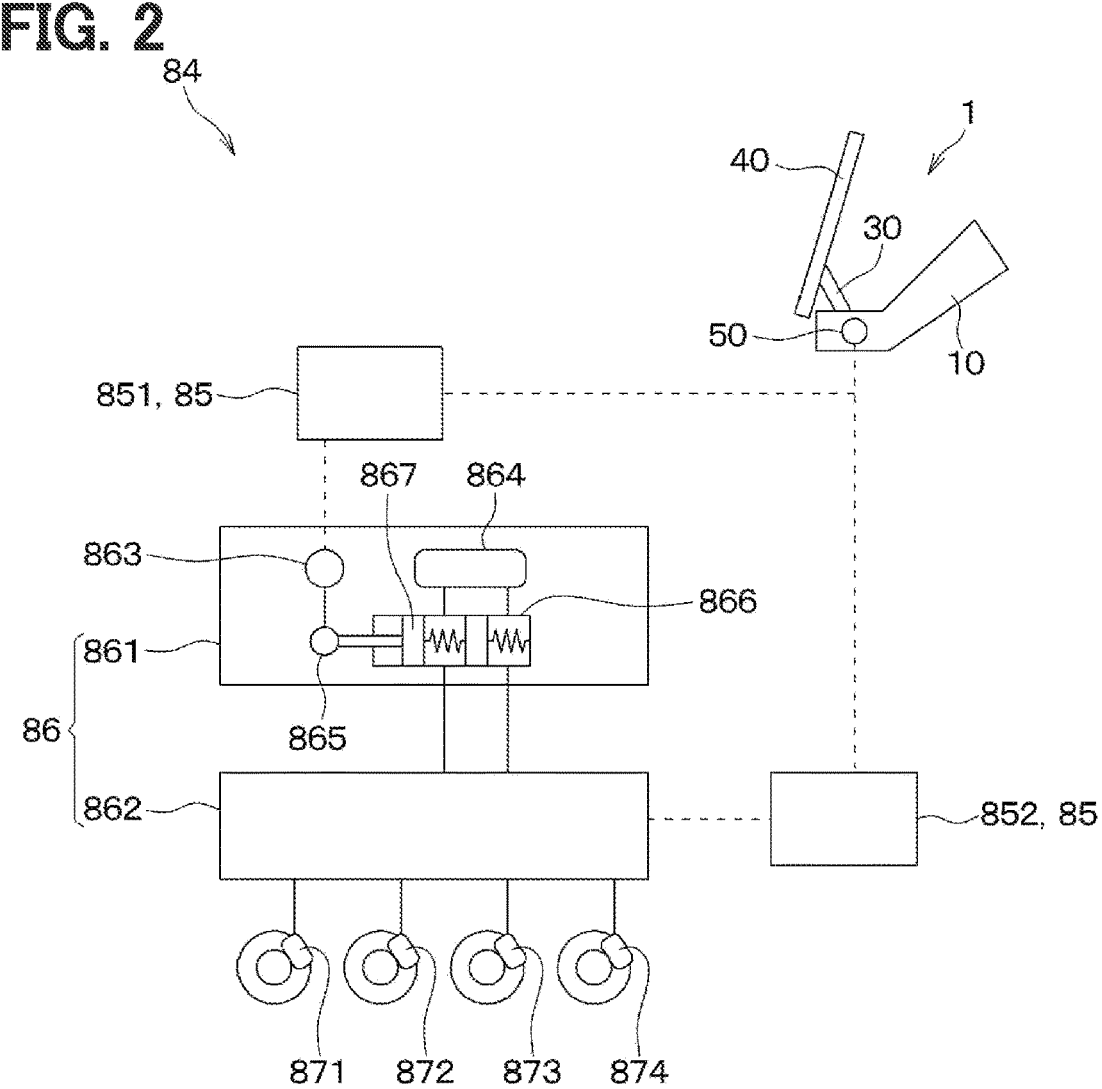
FIG. 2 is a diagram showing a schematic configuration of a brake-by-wire system in which the pedal device of the first embodiment is used.

The brake-by-wire system 84 is a system that drives wheel cylinders 871 to 874 with the configuration shown in FIG. 2, for example. In other words, the brake-by-wire system 84 generates a hydraulic pressure required for braking the vehicle 80 by a brake circuit 86 under drive control of an electronic control unit 85 based on an electric signal output from a sensor unit 50 of the pedal device 1, and drives the wheel cylinders 871 to 874. The electronic control unit 85 of FIG. 2 is mounted on the vehicle 80, and is also called as the ECU 85 in the description of the present embodiment.

In the brake-by-wire system 84 illustrated in FIG. 2, the ECU 85 is composed of a first ECU 851 and a second ECU 852. Also, the brake circuit 86 is composed of a first brake circuit 861 and a second brake circuit 862.

An electric signal output from the sensor unit 50 of the pedal device 1 is transmitted to the first ECU 851 and the second ECU 852. The first ECU 851 has a microcontroller, a drive circuit and the like (not shown). The first ECU 851 supplies electric power to a motor 863 of the first brake circuit 861 and the like to drive and control the first brake circuit 861. The second ECU 852 also has a microcontroller, drive circuit and the like (not shown). The second ECU 852 drives and controls an electromagnetic valve, a motor, and the like (not shown) provided in the second brake circuit 862.

The first brake circuit 861 has a reservoir 864, the motor 863, a gear mechanism 865, a master cylinder 866, and the like. The reservoir 864 stores brake fluid. The motor 863 drives the gear mechanism 865. The gear mechanism 865 reciprocates a master piston 867 of the master cylinder 866 in the axial direction of the master cylinder 866. Movement of the master piston 867 increases the hydraulic pressure of brake fluid supplied from the reservoir 864 to the master cylinder 866, and the hydraulic pressure is supplied from the first brake circuit 861 to the second brake circuit 862.

The second brake circuit 862 is a hydraulic circuit for performing normal control, sideslip prevention control, etc. by controlling the hydraulic pressure of each of the wheel cylinders 871 to 874 according to a control signal from the second ECU 852. Each of the wheel cylinder 871 to 874 is arranged for each of wheels of the vehicle and drives a brake pad provided for each wheel. The second ECU 852 may perform collision avoidance control, regenerative cooperation control, etc. based on signals from other ECUs (not shown), in addition to the normal control and sideslip prevention control described above.

When the driver 81 riding the vehicle 80 steps on a pedal pad 40 of the pedal device 1, the pedal pad 40 rotates, and a signal corresponding to a rotation angle of the pedal pad 40 is output from the sensor unit 50 to the first ECU 851 and the second ECU 852. The first ECU 851 drives the motor 863 to decelerate the vehicle 80. As a result, when the rotation speed of the motor 863 increases, the master cylinder 866 increases the pressure of the brake fluid supplied from the reservoir 864. The hydraulic pressure of the brake fluid is transmitted from the first brake circuit 861 to the second brake circuit 862.

The second ECU 852 performs various brake controls such as normal control and sideslip prevention control. For example, the second ECU 852 controls the driving of each of electromagnetic valves in the second brake circuit 862 in normal control for braking according to the operation of the pedal pad 40 by the driver 81. In the normal control, the second ECU 852 causes the hydraulic pressure supplied from the first brake circuit 861 to be supplied to the wheel cylinders 871 to 874 via the second brake circuit 862. As a result, the brake pads driven by the wheel cylinders 871 to 874 come into frictional contact with the corresponding brake discs, and the wheels are braked, thereby decelerating the vehicle 80.

As shown in FIGS. 3 to 6, the pedal device 1 includes a housing 10, a base plate 20, a shaft 30, the pedal pad 40, the sensor unit 50, a reaction force generating mechanism 60, a connecting rod 66, and the like. The pedal device 1 is an organ-type pedal device.

The organ-type pedal device 1 has a configuration in which a portion of the pedal pad 40 that is stepped on by the driver 81 is arranged in the vehicle upside than a center of rotation CL of the pedal pad 40 (i.e., in other words, an upside in a vehicle-installed state). Further, in the organ-type pedal device 1, the portion of the pedal pad 40 that is in the vehicle upside relative to the center of rotation CL performs a rotating operation toward a floor 2 or a dash panel in a vehicle compartment, in response to an increase in the pedaling force of the driver 81 applied to the pedal pad 40.

Further, in the description of the present embodiment, the center of rotation CL of the pedal pad 40 is also referred to as a pedal shaft center line CL. Further, an axial direction DPa of the pedal shaft center line CL shown in FIG. 7 is also called as a pedal shaft direction DPa, and a radial direction DPr of the pedal shaft center line CL is also called as a pedal shaft radial direction DPr.

As shown in FIGS. 3 to 6, the housing 10 has a housing body 11 and a housing cover 12. The housing 10 also serves as a support body for supporting the pedal pad 40 and the like, and is attached to a portion of the vehicle body via the base plate 20. That is, the housing 10 is a non-rotating member that is fixed to the vehicle body and does not rotate. Specifically, the housing body 11 of the housing 10 is attached via the base plate 20 to the floor 2, the dash panel, or the like inside the vehicle compartment that constitutes a part of the vehicle body. The dash panel may also be referred to as a partition wall that separates the interior of the vehicle compartment from the exterior such as an engine room of the vehicle 80 and the like, and may sometimes be called as a bulkhead.

Figure 7:
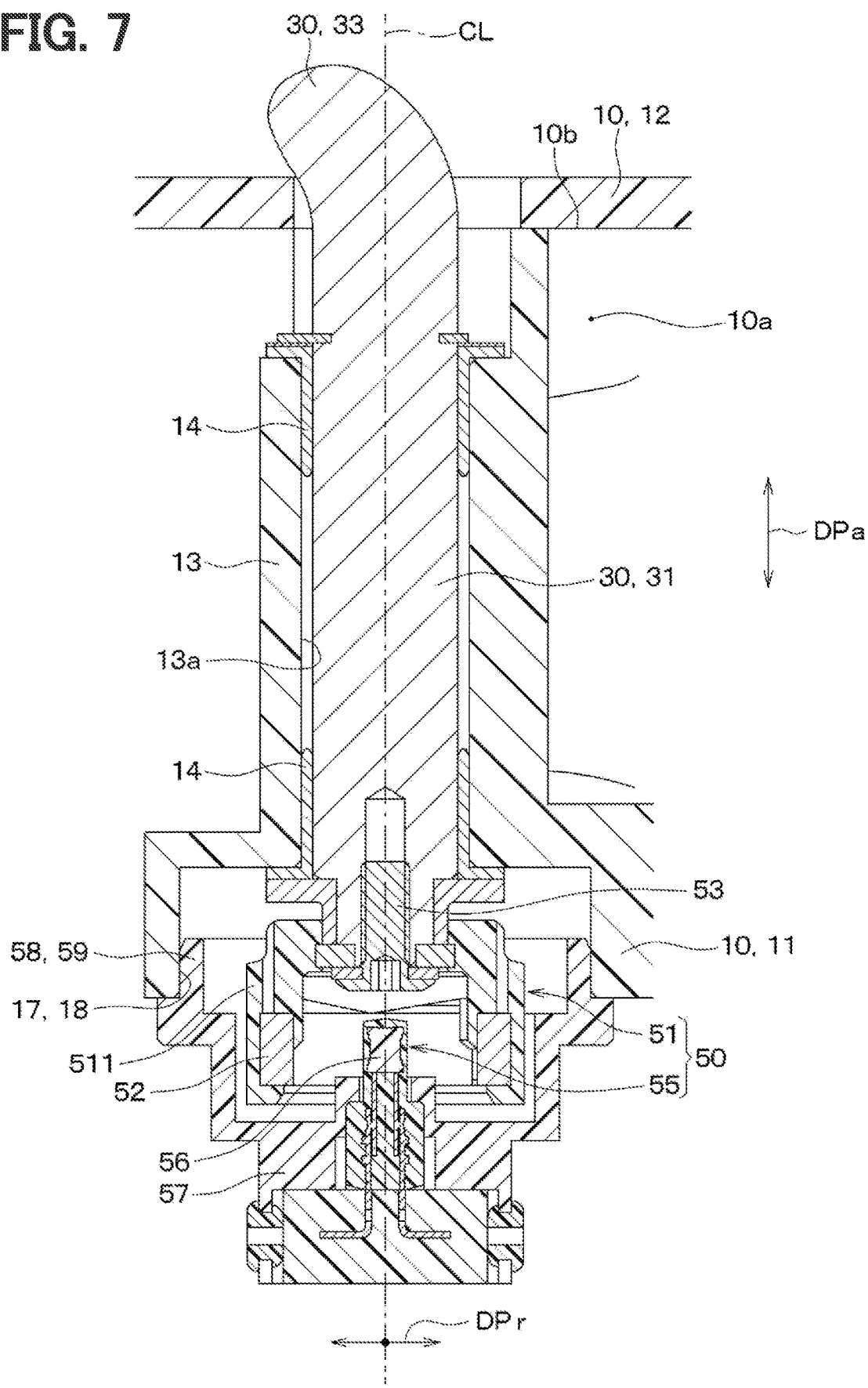
FIG. 7 is a cross-sectional view taken along a line VII-VII of FIGS. 4, 6.

As shown in FIG. 7, the housing body 11 has a rotating shaft support portion 13 for rotatably supporting the shaft 30.

Figure 3:
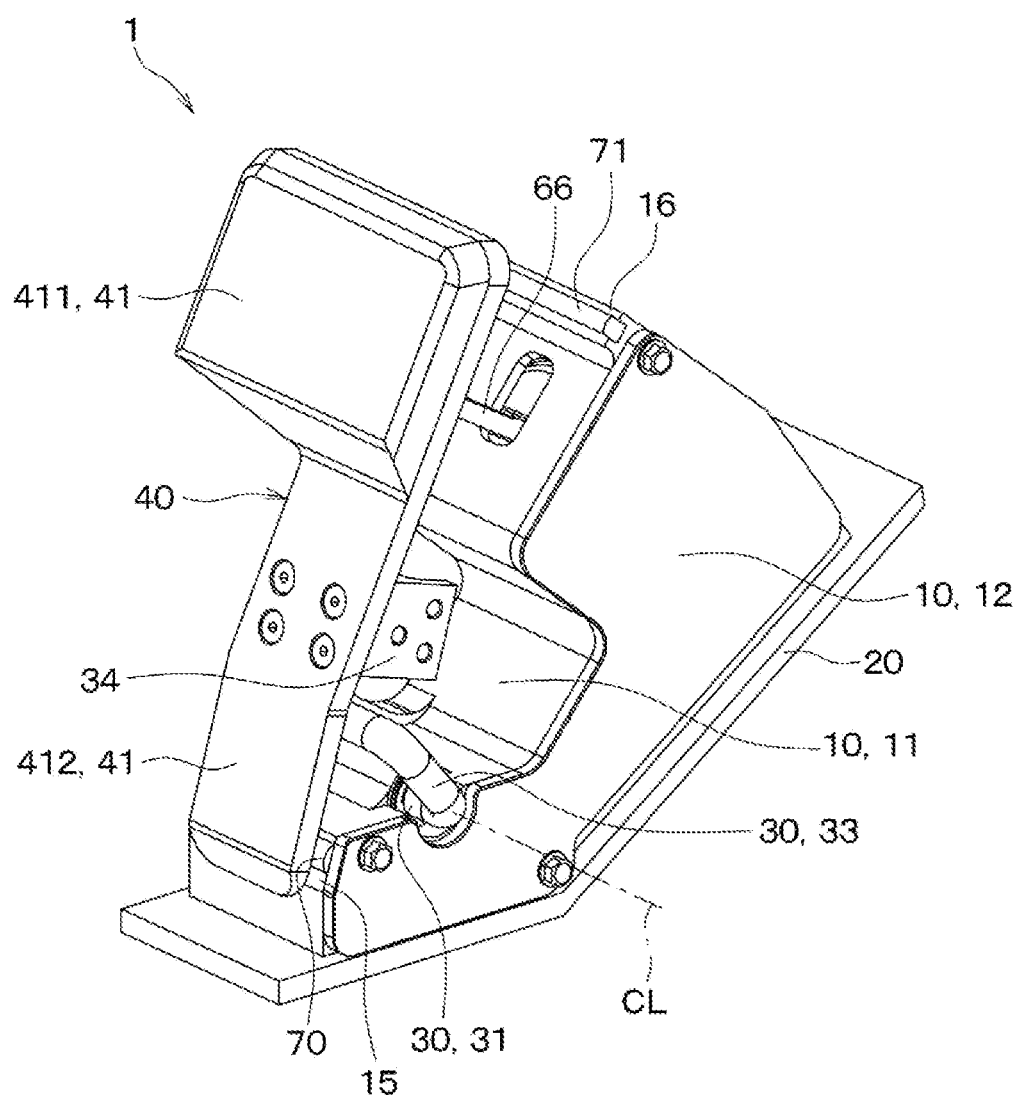
FIG. 3 is a perspective view showing the pedal device of the first embodiment.
Figure 6:
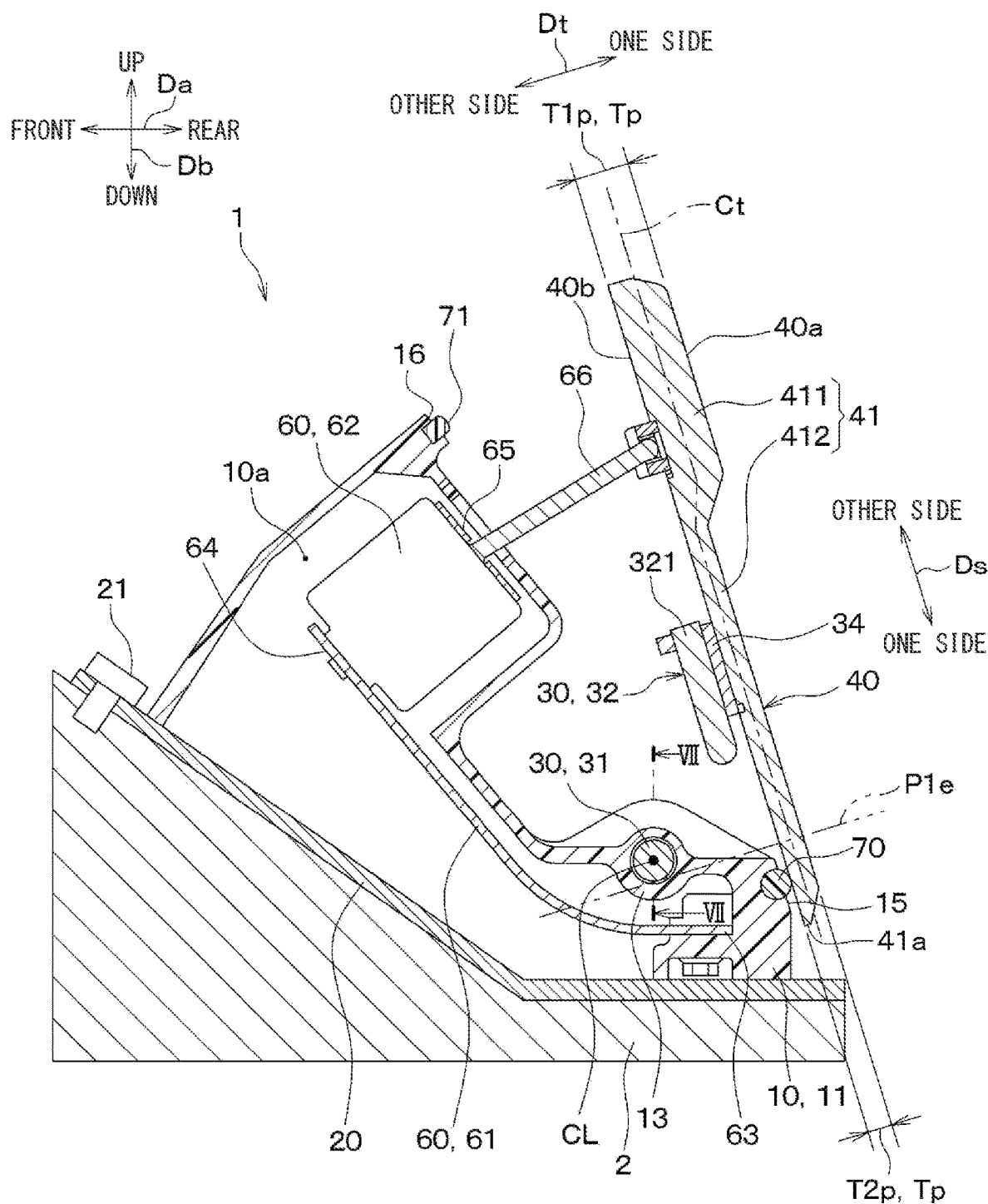
FIG. 6 is a cross-sectional view showing a section perpendicular to a center of a pedal shaft of the pedal device in the first embodiment.

As shown in FIGS. 6 and 7, inside the housing body 11, a space 10a in which the sensor unit 50, the reaction force generating mechanism 60 and the like are provided, that is, a housing space 10a, is formed. As shown in FIGS. 3 and 7, the housing cover 12 is provided on a side surface of the housing body 11 and closes an opening 10b of the housing space 10a formed in the side surface of the housing body 11.

As shown in FIGS. 3 to 6, the base plate 20 is provided on a surface of the housing 10 opposite to the pedal pad 40. The base plate 20 extends continuously from a portion of the housing 10 on the front side of the vehicle to a portion on the rear side of the vehicle. The base plate 20 is fixed to the floor 2 or the dash panel of the vehicle with bolts 21 or the like. The base plate 20 is made of a material having a higher strength than the housing body 11, such as metal. Therefore, the base plate 20 has a function of increasing the rigidity of the housing 10 (for example, the rigidity of the rotating shaft support portion 13 and its surroundings, which is described later).

Figure 4:
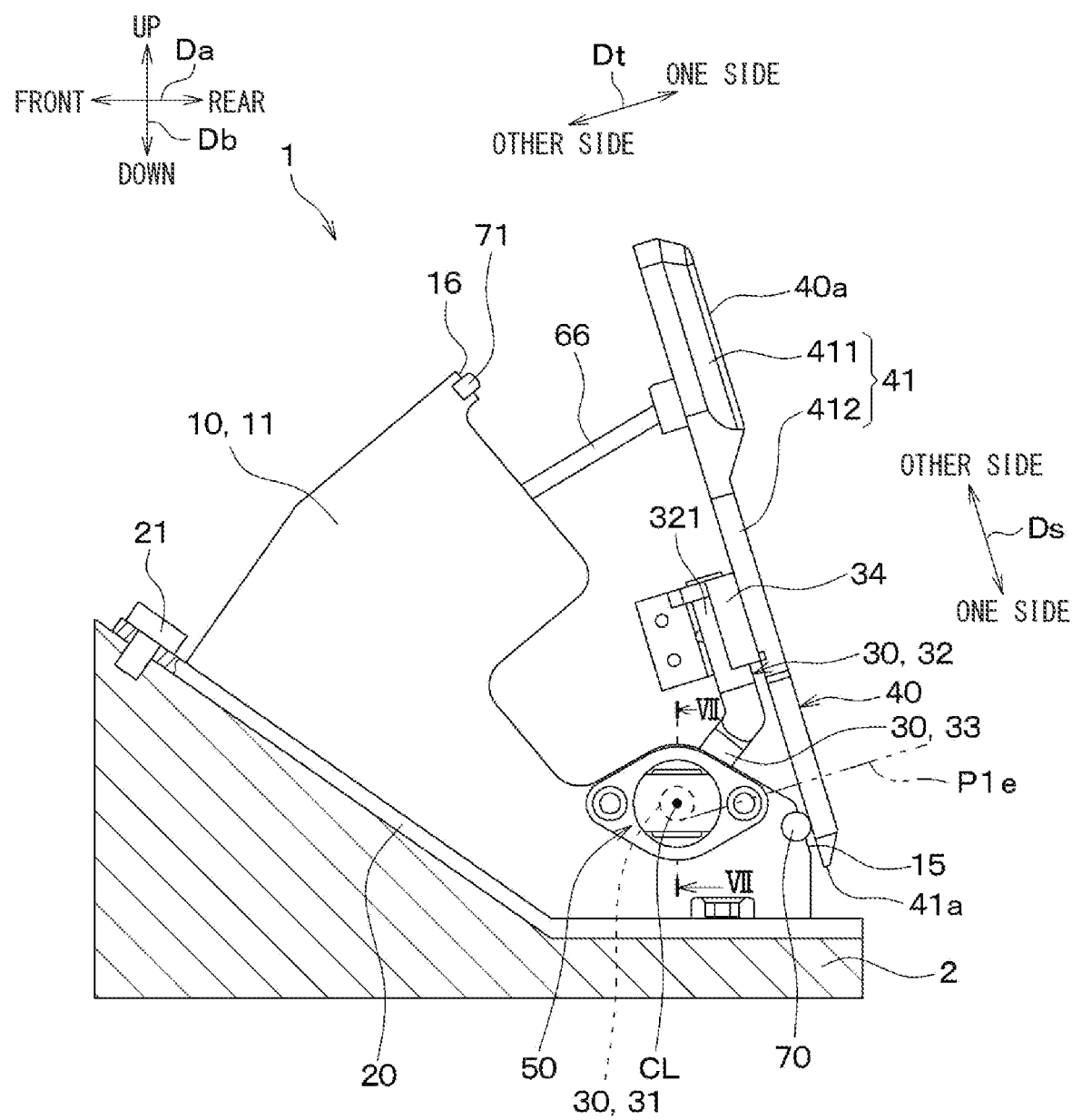
FIG. 4 is a side view showing the pedal device of the first embodiment with a pedal pad at a minimum rotation position.

As shown in FIGS. 3, 4, and 7, the shaft 30 is a rotating shaft member, and has a shape obtained by bending a columnar metal bar, for example, multiple times. The shaft 30 has a shaft portion 31, a fixing portion 32 and a connecting portion 33.

The shaft portion 31 of the shaft 30 is a pedal shaft centering on the pedal shaft center line CL and extending in the pedal shaft direction DPa, and is a portion of the shaft 30 that is arranged on the rotating shaft support portion 13. The fixing portion 32 is a portion that is non-rotatably fixed to the pedal pad 40. In the present embodiment, the fixing portion 32 is fixed to a fixing metal bracket 34 provided on a pedal back surface 40b that is a surface of the pedal pad 40 opposite to a surface that receives the pedaling force from the driver 81. The connecting portion 33 of the shaft 30 is a portion that connects the shaft portion 31 and the fixing portion 32.

With such a structure of the shaft 30, the pedal pad 40 does not come into contact with the rotating shaft support portion 13 of the housing 10 at any rotation angle within a movable range of the pedal pad 40, that is, is arranged away from the rotation shaft support portion 13.

Because the shaft 30 is provided with the shaft portion 31, the fixing portion 32 and the connecting portion 33, the pedal shaft center line CL and the pedal pad 40 can be arranged at separate positions separated from each other, and a space around the pedal shaft center line CL is used for disposing the sensor unit 50 with ease.

As shown in FIGS. 6 and 7, the shaft 30 is rotatably supported by the rotating shaft support portion 13 provided on the housing body 11. Specifically, inside the rotating shaft support portion 13, a rotating shaft hole 13a centering on the pedal shaft center line CL and extending in the pedal shaft direction DPa is formed, into which the shaft portion 31 of the shaft 30 is inserted. Further, a cylindrical bearing 14 is provided in the rotating shaft hole 13a, and the bearing 14 is arranged at a position between the rotating shaft support portion 13 and the shaft portion 31 of the shaft 30. With such a configuration, the rotating shaft support portion 13 rotatably supports the shaft portion 31 of the shaft 30 via the bearing 14.

Further, the shaft 30 is supported only by the rotating shaft support portion 13 provided in the housing body 11, and is not supported by the housing cover 12. For example, even when the shaft 30 rotates about the pedal shaft center line CL in response to the step-on operation of the driver 81, the shaft 30 remains separated from the housing cover 12 with a gap.

The pedal pad 40 has a plate portion 41 having a plate shape that has a thickness in a plate thickness direction Dt, and extends in an extending direction Ds, and is made of, for example, metal or resin. The pedal pad 40 rotates about the pedal shaft center line CL when the driver 81 performs the step-on operation on the plate portion 41 from one side in the plate thickness direction Dt. Specifically, the housing supports the pedal pad 40 via the shaft 30 to be rotatable about the pedal shaft center line CL. Further, the pedal pad 40 is fixed to the fixing portion 32 of the shaft 30, the pedal pad 40 and the shaft 30 rotate integrally about the pedal shaft center line CL as the driver 81 performs the step-on operation of the pedal.

In the present embodiment, the pedal shaft direction DPa, the plate thickness direction Dt and the extending direction Ds of the plate portion 41 are directions that intersect each other, strictly speaking, directions that are perpendicular to each other. Further, in the description of the present embodiment, a pedal plate thickness direction Dt of the plate portion 41 is also referred to as the pedal plate thickness direction Dt, and the extending direction Ds of the plate portion 41 is also referred to as the pedal extending direction Ds.

The pedal pad 40 is arranged obliquely with respect to the vehicle front-rear direction Da in the non-stepping state in which the pedal pad 40 is not subject to the step-on operation by the driver 81. Specifically, the pedal pad 40 is obliquely arranged such that an upper end portion of the pedal pad 40 is arranged in front of and above with respect to a lower end portion of the pedal pad 40. That is, when the pedal pad is in the non-stepping state, the plate shape of the plate portion 41 extends, with one side of the pedal extending direction Ds being positioned in the vehicle downside relative to the other side of the pedal extending direction Ds. In the present embodiment, even in a maximum stepped state of the pedal pad 40, which is described later, one side in the pedal extending direction Ds is positioned in the vehicle downside compared to the other side in the pedal extending direction Ds.

The thickness of the plate portion 41 of the pedal pad 40 is not constant, and the plate portion 41 has a thick portion 411 and a thin portion 412 that is arranged on one side of the thick portion 411 in the pedal extending direction Ds. The thick portion 411 is thicker than the thin portion 412. In the present embodiment, a surface of the plate portion 41 of the pedal pad 40 on one side in the pedal plate thickness direction Dt and formed in the thick portion 411 functions as a stepped surface 40a of the pedal pad 40 to be stepped on by the driver 81, when the driver 81 performs the step-on operation.

Further, the plate portion 41 of the pedal pad 40 has the pedal back surface 40b facing the other side opposite to the one side in the pedal plate thickness direction Dt. The pedal back surface 40b is formed over the entire length of the plate portion 41 in the pedal extending direction Ds. Note that arrangement of the pedal pad 40 is not limited to the arrangement shown in the drawing, and it may be arranged such that the plate portion 41 may have a posture substantially along the vehicle vertical direction Db when the pedal pad 40 is in the non-stepping state.

Here, referring to the positional relationship between the plate portion 41 of the pedal pad 40 and the center of the pedal shaft center line CL, as shown in FIG. 6, the pedal shaft center line CL is provided at a position shifted toward the other side in the plate thickness direction Dt with respect to a center of thickness Ct of the plate shape of the plate portion 41. A plate thickness Tp, which is a thickness Tp of the plate portion 41 in the plate shape, is a dimension of the plate shape in the pedal plate thickness direction Dt, and the thickness Tp is different in the thick portion 411 and in the thin portion 412. That is, a thickness T1p that is the plate thickness Tp of the thick portion 411 is greater than a thickness T2p that is the plate thickness Tp of the thin portion 412.

A center of thickness Ct of the plate shape of the plate portion 41, that is, the center of plate thickness Ct, is represented by a line or plane obtained by connecting the center points of the plate thicknesses Tp of the plate shape portions. For example, in FIG. 6, the center of plate thickness Ct is indicated by a one-dot chain line curved at a position between the thick portion 411 and the thin portion 412. That is, the pedal shaft center line CL being shifted away from the center of plate thickness Ct toward the other side in the pedal plate thickness direction Dt means that it is shifted to the other side in the pedal plate thickness direction Dt with respect to the one-dot chain line indicating the center of plate thickness Ct.

Further, the plate shape of the plate portion 41 extends to one side in the pedal extending direction Ds more than the shaft portion 31, which is the pedal shaft. In other words, the plate shape of the plate portion 41 has a plate one end surface 41a on one side in the pedal extending direction Ds, and the plate one end surface 41a is arranged at a position further on the one side in the pedal extending direction Ds than an edge position P1e. In the following description, the edge position P1e of the shaft portion 31 in the pedal extending direction Ds on the one side is also referred to as a one-end-side edge position P1e of the shaft portion 31 or the one-end-side edge position P1e of the pedal shaft.

Further, as shown in FIG. 6, the pedal back surface 40b of the plate portion 41 of the pedal pad 40 is, in other words, the back surface of the plate shape of the plate portion 41. Further, at least a portion of the shaft portion 31 is provided on the other side in the pedal plate thickness direction Dt than a portion of the pedal back surface 40*b* positioned on the farthest one side in the pedal plate thickness direction Dt.

For example, if it is assumed that the pedal back surface 40*b* is uneven, the portion of the pedal back surface 40*b* that is positioned on the farthest one side in the pedal plate thickness direction Dt is a part of the pedal back surface 40*b*. However, in the present embodiment, the pedal back surface 40*b* has a planar shape perpendicular to the plate thickness direction Dt. Therefore, in the present embodiment, the entire pedal back surface 40*b* corresponds to a portion of the pedal back surface 40*b* that is a portion positioned on the farthest one side in the pedal plate thickness direction Dt. Further, in the present embodiment, not a part of the shaft portion 31 but the entire shaft portion 31 is provided on the other side in the pedal plate thickness direction Dt than the portion positioned on the farthest one side in the pedal plate thickness direction Dt of the pedal back surface 40*b*.

Figure 5:
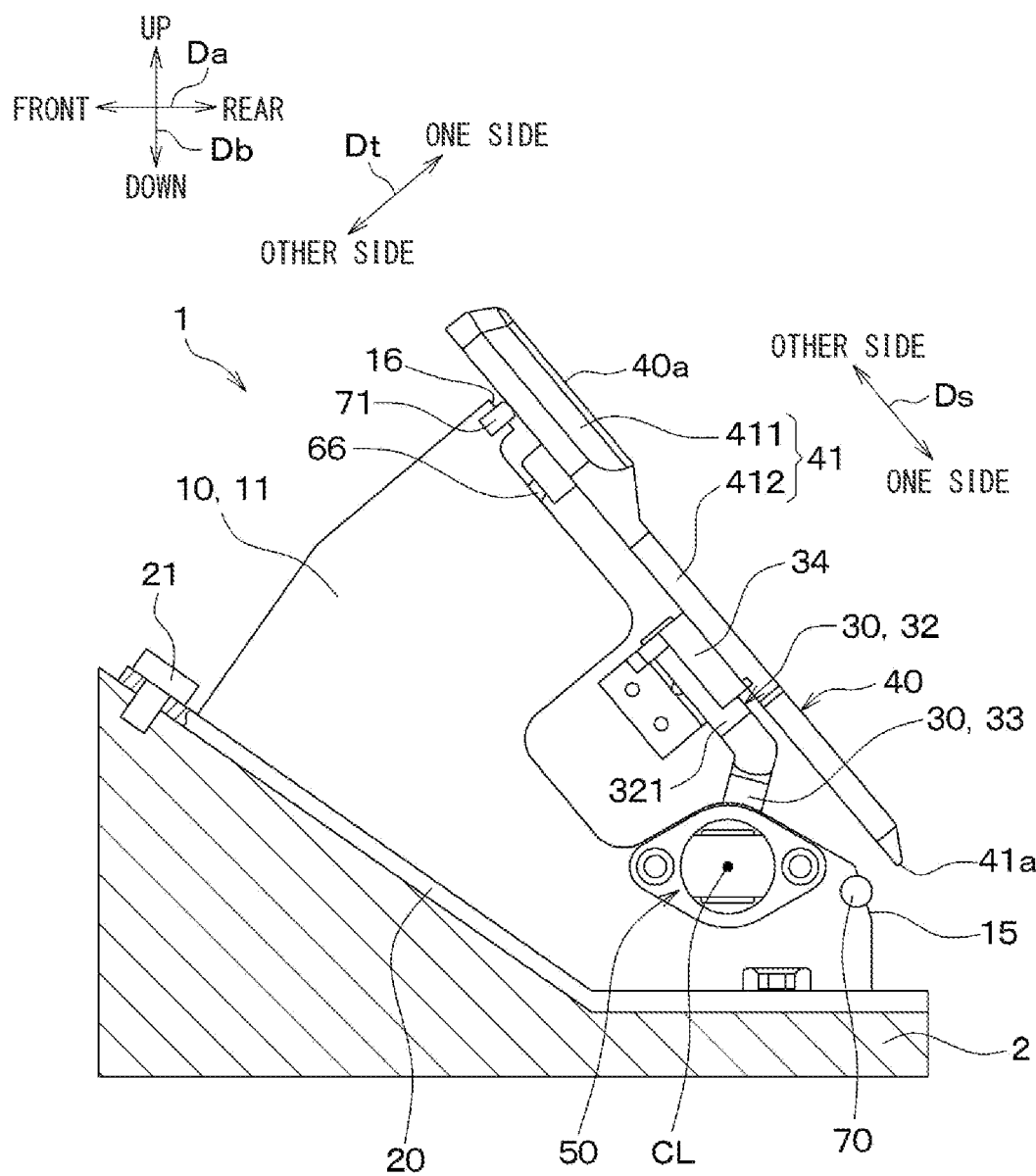
FIG. 5 is a side view showing the pedal device of the first embodiment with the pedal pad at a maximum rotation position.

As shown in FIGS. 4 to 6, the fixing portion 32 of the shaft 30 is fixed to the pedal pad 40, and the fixing portion 32 has an extending portion 321 extending in the pedal extending direction Ds. More specifically, the extending portion 321 of the fixing portion 32 is fixed to the plate portion 41 of the pedal pad 40 by the fixing metal bracket 34 on the other side of the pedal shaft center line CL in the pedal extending direction Ds.

Further, as shown in FIGS. 3 and 4, the connecting portion 33 of the shaft is arranged at a position between the shaft portion 31 and the fixing portion 32 provided on one side of the shaft portion 31 in the pedal plate thickness direction Dt. The connecting portion 33 then extends obliquely with respect to the pedal thickness direction Dt, so that the connecting portion 33 extends towards the other side of the pedal extending direction Ds, as it extends toward the one side in the pedal thickness direction Dt.

As shown in FIGS. 4 and 5, the pedal pad 40 rotates within a limited predetermined rotation angle range (in other words, movable range) of less than one rotation. That is, the pedal pad 40 swings about the pedal shaft center line CL in accordance with the step-on operation of the driver 81.

Specifically, the rotation angle range in the rotation of the pedal pad 40 is a range from a minimum rotation position to a maximum rotation position of the pedal pad 40. That is, when the pedal pad 40 is in the non-stepping state, the rotation angle of the pedal pad 40 is at the minimum rotation position, and when the pedal pad 40 is in the maximum stepped state, i.e., is fully stepped on by the driver 81, the rotation angle of the pedal pad 40 is at the maximum rotation position.

FIGS. 3, 4, and 6 show the pedal device 1 in the non-stepping state of the pedal pad 40, that is, a state in which the pedaling force of the driver 81 is not applied to the pedal pad 40. On the other hand, FIG. 5 shows the pedal device 1 in the maximum stepped state of the pedal pad 40, that is, in a state in which the pedaling force of the driver 81 is applied to the pedal pad 40 and the pedal pad 40 abuts against the full-open stopper 71.

For example, within the rotation angle range described above, the pedal pad 40 rotates to displace its upper end portion toward the front and downside of the vehicle, as the pedaling force of the driver 81 applied to the pedal pad 40 from the one side in the pedal plate thickness direction Dt increases. In short, the pedal pad 40 rotates from the posture shown in FIG. 4 to the posture shown in FIG. 5 as the pedaling force of the driver 81 increases. Conversely, the pedal pad 40 rotates to displace its upper end portion toward the rear and upside of the vehicle, as the pedaling force of the driver 81 applied to the pedal pad 40 from the one side in the pedal plate thickness direction Dt decreases by the action of the reaction force generating mechanism 60. In short, the pedal pad 40 rotates from the posture shown in FIG. 5 to the posture shown in FIG. 4 as the pedaling force of the driver 81 decreases.

In the present embodiment, the minimum rotation position of the pedal pad 40 is defined by the full-close stopper 70 as a first stopper, and the maximum rotation position of the pedal pad 40 is defined by the full-open stopper 71 as a second stopper. The full-close stopper 70 and the full-open stopper 71 are each made of resin, rubber, or the like.

The full-close stopper 70 is provided at a portion of the housing 10 positioned rearward of the vehicle relative to the pedal shaft center line CL. Specifically, the full-close stopper 70 is embedded in the wall surface 15 facing obliquely to the rear and upside of the vehicle at a portion of the housing 10 positioned at the rear of the vehicle. When the pedal pad 40 is in the non-stepping state, the full-close stopper 70 contacts the lower end portion of the pedal back surface 40*b* or its proximity, and holds the pedal pad 40 at the minimum rotation position.

The full-open stopper 71 is provided at a portion of the housing 10 positioned in front of the vehicle with respect to the pedal shaft center line CL. Specifically, the full-open stopper 71 is provided at an upper end portion of the wall surface of the housing 10 positioned in front of the vehicle. More specifically, the full-open stopper 71 is embedded in a wall surface 16 facing rear of the vehicle and obliquely upward of the vehicle in a portion of the housing 10 positioned in front of the vehicle. When the pedal pad 40 is in a fully stepped state, the full-open stopper 71 contacts the upper end of the pedal back surface 40*b* or its proximity, and holds the pedal pad 40 at the maximum rotation position.

As shown in FIG. 6, the reaction force generating mechanism 60 is provided in the housing 10 to generate a reaction force against the pedaling force applied to the pedal pad 40 by the driver 81. Since the pedal device 1 includes the reaction force generating mechanism 60, even when a mechanical connection between the pedal pad 40 and the master cylinder 866 (see FIG. 2) is eliminated, it is possible to obtain the same reaction force as when they are mechanically connected. The case where the pedal pad 40 and the master cylinder 866 are mechanically connected is, in other words, a case where a hydraulic reaction force is obtainable.

In the present embodiment, the reaction force generating mechanism 60 is composed of, for example, a leaf spring 61 and one or more coil springs (not shown) provided inside a holder 62. By configuring the reaction force generating mechanism 60 with one or a plurality of elastic members, it is possible to form a predetermined pedaling force characteristic according to the rotation angle of the pedal pad 40.

The leaf spring 61 is curved to form a convex curved surface toward the floor 2 when not receiving a load. A one end 63 of the leaf spring 61 is arranged at a position between the pedal shaft center line CL and the base plate 20, and is fixed to the housing 10 or the base plate 20. On the other hand, the holder 62 is fixed to an other end 64 of the leaf spring 61. The leaf spring 61 is arranged to bend along an imaginary plane perpendicular to the pedal shaft center line CL. Therefore, when the leaf spring 61 receives a load from a holder 62 side, a portion on an other end 64 side where the holder 62 is fixed bends to approach the base plate 20.

The holder 62 is formed in a cylindrical shape with a bottom. Although not shown, one or more coil springs or the like are provided inside the holder 62. A lid member 65 is provided at the end of the holder 62 on the pedal pad 40 side. The lid member 65 is provided so as to be able to reciprocate inside the holder 62 as the coil spring provided inside the holder 62 expands and contracts.

The lid member 65 and the pedal pad 40 are connected by a connecting rod 66. One end of the connecting rod 66 and the pedal pad 40 are rotatably connected, and the other end of the connecting rod 66 and the lid member 65 are also rotatably connected. With such a configuration, when the driver 81 applies a pedaling force to the pedal pad 40 and the pedal pad 40 rotates toward the housing 10, a load is applied from the pedal pad 40 to each member of the reaction force generating mechanism 60 via the connecting rod 66. Therefore, the leaf spring 61 and the coil spring that constitute the reaction force generating mechanism 60 generate a reaction force against the pedaling force applied to the pedal pad 40 by the driver 81. The configurations of the reaction force generating mechanism 60 and the connecting rod 66 are not limited to those illustrated above, and various other configurations are also adoptable.

As described above, the pedal device 1 of the present embodiment is configured such that the pedal pad 40 and the shaft 30 rotate about the same pedal shaft center line CL. Therefore, the amount of operation of the pedal pad 40 (that is, the rotation angle of the pedal pad 40) stepped on by the driver 81 to control the travel of the vehicle is the same as the rotation angle of the shaft 30. The rotation angles of the pedal pad 40 and the shaft 30 are directly detected by the sensor unit 50 provided on or around the pedal shaft center line CL. In the following description, the rotation angle of the pedal pad 40 and the shaft 30 is referred to as "pedal rotation angle."

As shown in FIG. 7, the sensor unit 50 includes a rotating portion 51 provided on the shaft portion 31 of the shaft 30 and a signal output portion 55 provided on the housing body 11 for outputting a signal corresponding to the phase of the rotating portion 51. In the present embodiment, as the sensor unit 50, a non-contact sensor capable of detecting the pedal rotation angle is employed in which the rotating portion 51 and the signal output portion 55 are non-contacting. In other words, in the sensor unit 50, the rotating portion 51, which is a first portion, and the signal output portion 55, which is a second portion, move relative to each other in a non-contact manner as the pedal pad 40 rotates, for detecting the pedal rotation angle.

The rotating portion 51 includes, for example, a magnetic circuit 52 formed in a cylindrical shape by a magnet and a yoke, and a holding portion 511 that holds the magnetic circuit 52. The rotating portion 51 is fixed to an end portion of the shaft 30 (specifically, a tip portion of the shaft portion 31) with a bolt 53 or the like, and rotates together with the shaft 30. In the present embodiment, the rotation center of the rotating portion 51 is the same as the pedal shaft center line CL.

The magnetic circuit 52 forming the rotating portion 51 forms a magnetic field in which magnetic flux flows to intersect the pedal shaft center line CL. Therefore, the rotating portion 51 changes the magnetic field around the signal output portion 55 as the pedal pad 40 rotates.

On the other hand, the signal output portion 55 includes one or more Hall ICs 56, a sensor holding portion 57 for molding the Hall ICs 56, and the like. The Hall IC 56 has a Hall element and an integrated circuit that amplifies the signal output from the Hall element. The Hall IC 56 outputs an electric signal corresponding to the density of magnetic flux passing through the magneto-sensitive surface of the Hall element. That is, the Hall IC 56 outputs an electric signal corresponding to the magnetic field around the signal output portion 55.

For example, when the rotating portion 51 rotates about the pedal shaft center line CL together with the shaft portion 31 of the shaft 30, the density of magnetic flux passing through the magneto-sensitive surface of the Hall element of the Hall IC 56 changes. Therefore, the signal output portion 55 outputs an electric signal corresponding to the rotation angle of the pedal pad 40 and the shaft 30 (that is, the pedal rotation angle).

The signal output portion 55 of the sensor unit 50 and the housing 10 have a positioning structure that allows a center of the sensor of the signal output portion 55 to be assembled at a predetermined position. The predetermined position is a predetermined position of the center of the sensor of the signal output portion 55, and is a position where the phase of the rotating portion 51 rotating about the pedal shaft center line CL can be detected.

The center of the sensor of the signal output portion 55 is a center position of the portion of the signal output portion 55 that has a sensing function. The positioning structure of the present embodiment enables a coaxial assembly of the center of the sensor of the signal output portion 55 and the pedal shaft center line CL. The positioning structure is composed of, for example, a concave portion 17 provided on the housing 10 and a convex portion 58 provided on the signal output portion 55. The engagement of the concave portion 17 and the convex portion 58 places the center of the sensor of the signal output portion 55 on the pedal shaft center line CL.

As an example of the positioning structure, in the present embodiment, an opening 18 for installing the signal output portion 55 is provided at a position corresponding to one side of the shaft portion 31 of the shaft 30 in the housing 10. An inner wall surface of the opening 18 provided in the housing 10 corresponds to the concave portion 17 of the positioning structure. On the other hand, the sensor holding portion 57 of the signal output portion 55 is provided with a protrusion 59 that engages with the inner wall surface of the opening 18 provided in the housing 10. An outer wall surface of the protrusion 59 (that is, the outer wall surface of the sensor holding portion 57) corresponds to the convex portion 58 of the positioning structure. Therefore, by the engagement of the outer wall surface of the protrusion 59 provided on the sensor holding portion 57 of the signal output portion 55 to the inner wall surface of the opening 18 provided on the housing 10, the center of the sensor of the signal output portion 55 is assembled at a predetermined position. Specifically, the center of the sensor of the signal output portion 55 and the pedal shaft center line CL are assembled coaxially. The configuration of the sensor unit 50 and the configuration of the positioning structure are not limited to those illustrated above, and various configurations can be adopted as described in each of the embodiments described later.

As shown in FIGS. 1, 4, and 7, in the configuration of the pedal device 1 of the present embodiment described above, when the pedaling force of the driver 81 is applied to the pedal pad 40, the pedal pad 40 and the shaft 30 rotate about the center of the pedal shaft CL. Specifically, the pedal pad 40 and the shaft 30 rotate about the pedal shaft center line CL such that the portion of the pedal pad 40 above the pedal shaft center line CL moves toward the floor 2 or the dash panel. At such time, the sensor unit 50 detects a change in the phase of the rotating portion 51 that rotates integrally with the shaft portion 31 of the shaft 30 by means of the signal output portion provided in the housing body 11. Then, the signal output portion 55 outputs an electric signal corresponding to the pedal rotation angle to the ECU 85 (see FIG. 2) of the vehicle 80. The ECU 85 drives and controls the brake circuit 86 to generate hydraulic pressure (for example, oil pressure) required for braking the vehicle 80, and the hydraulic pressure drives the brake pads to decelerate or stop the vehicle 80.

The pedal device 1 of the present embodiment described above has the following effects.

According to the present embodiment, as shown in FIG. 6, in the pedal device 1, the pedal shaft center line CL is shifted toward the other side in the pedal plate thickness direction Dt with respect to the center of thickness Ct of the plate shape of the plate portion 41. In such manner, compared with the configuration of the pedal device of the Patent Document 1, it is possible to increase the diameter of the shaft portion 31 of the shaft 30 without forming an obstacle on one side of the pedal pad 40, i.e., on a driver 81's side thereof. Therefore, it is possible to increase the rigidity of the shaft 30 including the shaft portion 31 while appropriately ensuring the operability of the pedal device 1.

Further, when the pedal pad 40 is in the non-stepping state, one side in the pedal extending direction Ds is positioned lower than the other side in the vehicle. The plate shape of the plate portion 41 of the pedal pad 40 extends toward the one side in the pedal extending direction Ds more than the shaft portion 31 of the shaft 30. Therefore, the shaft portion 31 of the shaft 30 and portions around the shaft portion 31 (for example, the rotating shaft support portion 13 and the bearing 14) are protectable by the pedal pad 40 from the foot of the driver 81 stepping on the pedal pad 40.

(1) Further, according to the present embodiment, at least a portion of the shaft portion 31 of the shaft 30 is positioned on the other side in the pedal plate thickness direction Dt than a portion of the pedal back surface 40b positioned on the farthest one side in the pedal plate thickness direction Dt. This also makes it possible to increase the diameter of the shaft portion 31 of the shaft 30 without forming an obstacle on one side of the pedal pad 40 close to the driver 81, as compared with the configuration of the pedal device of the Patent Document 1.

(2) Further, according to the present embodiment, as shown in FIGS. 4 and 7, the shaft 30 has the shaft portion 31 as a pedal shaft centering on the pedal shaft center line CL and extending in the pedal shaft direction DPa, the fixing portion 32 that is non-rotatably fixed to the pedal pad 40, and the connecting portion 33. The connecting portion 33 connects the shaft portion 31 and the fixing portion 32.

That is, the shaft 30 including the shaft portion 31 as a pedal shaft also has the function of connecting the shaft portion 31 and the pedal pad 40. Therefore, even when the shaft portion 31 is at an offset position away from the pedal back surface 40b as in the present embodiment, the shaft portion 31 and the pedal pad 40 are connectable without requiring other components for connecting the shaft portion 31 and the pedal pad 40. In such manner, it is possible to reduce the number of parts.

Further, since the pedal pad 40 can be arranged away from the pedal shaft center line CL (that is, the center of the shaft portion 31), the sensor unit 50 can be provided in the space around the pedal shaft center line CL. The sensor unit 50 can directly detect the pedal rotation angle.

(3) Further, according to the present embodiment, as shown in FIG. 4, the fixing portion 32 of the shaft 30 has the extending portion 321 extending in the pedal extending direction Ds. The extending portion 321 is fixed to the plate portion 41 of the pedal pad 40 on the other side of the pedal shaft center line CL in the pedal extending direction Ds. Therefore, when the driver 81 steps on the pedal pad 40, the extending portion 321 of the shaft 30 can resist the pedaling force of the driver 81 so that the pedal pad 40 is not easily bent. In short, the extending portion 321 of the shaft 30 can effectively reinforce the pedal pad 40.

(4) Further, according to the present embodiment, the housing body 11 has the rotating shaft support portion 13 as shown in FIGS. 6 and 7. The rotating shaft hole 13a into which the shaft portion 31 of the shaft 30 is inserted is formed inside the rotating shaft support portion 13, and the rotating shaft support portion 13 supports the shaft portion 31 rotatably. The housing cover 12 closes the opening 10b of the housing space 10a formed inside the housing body 11 without supporting the shaft portion 31 of the shaft 30.

For example, it may be assumed that, if the housing body 11 and the housing cover 12 are both configured to support the shaft portion 31, the shaft 30 may possibly be tilted from a normal posture (for example, design posture), due to the variation of assembly of the housing body 11 and the housing cover 12. In contrast, in the present embodiment, the shaft 30 is supported only by the housing body 11, and the housing cover 12 does not support the shaft 30. Therefore, it is possible to prevent the posture of the shaft 30 with respect to the housing body 11 from tilting from the normal posture.

(5) Further, according to the present embodiment, as shown in FIG. 7, the bearing 14 is provided in the rotating shaft hole 13a, and the bearing 14 is arranged at a position between the rotating shaft support portion 13 and the shaft portion 31.

By using the bearing 14 in such manner, it is possible to reduce wear of the rotating shaft support portion 13 and the shaft portion 31 of the shaft 30. Therefore, since the shaft portion 31 of the shaft 30 can be maintained coaxial with the center of the rotating shaft support portion 13 with high accuracy, the detection accuracy of the pedal rotation angle by the sensor unit 50 is improved.

(6) Further, according to the present embodiment, the shaft 30 rotates integrally with the pedal pad 40 as shown in FIGS. 4 and 7. The sensor unit 50 has the rotating portion 51 provided on the shaft portion 31 of the shaft 30 and the signal output portion 55 provided on the housing 10 for outputting a signal corresponding to the phase of the rotating portion 51.

This allows the sensor unit 50 to directly detect the pedal rotation angle. That is, the sensor unit 50 is configured to be capable of outputting a highly accurate electric signal corresponding to the actual amount of operation (that is, the pedal rotation angle) of the pedal pad 40 stepped on by the driver 81 for controlling the travel of the vehicle. Therefore, the pedal device 1 can improve the detection accuracy of the pedal operation amount thereby realizing more accurate vehicle travel control.

(7) Further, according to the present embodiment, as shown in FIG. 7, both of the rotation center of the rotating portion 51 of the sensor unit 50 and the center of the sensor of the signal output portion 55 are arranged on the pedal shaft center line CL. Thereby, the detection accuracy of the pedal rotation angle by the sensor unit 50 is improvable.

(8) Further, according to the present embodiment, as shown in FIG. 7, the positioning structure is provided which enables assembly of the signal output portion 55 of the sensor unit 50 on the housing 10, in which the censor center of the signal output portion 55 of the sensor unit 50 is assembled at a predetermined position where the phase of the rotating portion 51 can be detected. The positioning structure is provided by the concave portion 17 provided in the housing 10 and the convex portion 58 provided in the signal output portion 55, and the concave portion 17 and the convex portion 58 are engageable. In such manner, the center of the sensor of the signal output portion 55 is prevented from being shifted from the predetermined position (i.e., a position on the pedal shaft center line CL In the present embodiment) when the signal output portion 55 of the sensor unit 50 is assembled to the housing 10. As a result, the detection accuracy of the pedal rotation angle by the sensor unit 50 is improvable.

Further, in the present embodiment, the inner wall surface of the opening 18 provided in the housing 10 corresponds to the concave portion 17 of the positioning structure. On the other hand, the outer wall surface of the protrusion 59 provided on the sensor holding portion 57 of the signal output portion 55 corresponds to the convex portion 58 of the positioning structure. In such manner, a specific configuration of the convex portion 58 and the concave portion 17 regarding the positioning structure is exemplified.

(9) Further, according to the present embodiment, the sensor unit 50 is provided such that the rotating portion 51 as the first portion and the signal output portion 55 as the second portion move relative to each other in a non-contacting manner, as the pedal pad 40 rotates, the pedal rotation angle is detected. In short, the sensor unit 50 is a non-contact sensor. That is, since there is no contact between the rotating portion 51 and the signal output portion 55, there is no wear or damage to both members, and the reliability of the output signal from the sensor unit 50 is improvable.

(10) Further, according to the present embodiment, the rotating portion 51 of the sensor unit 50 changes the magnetic field around the signal output portion 55 as the pedal pad 40 rotates. Then, the signal output portion 55 of the sensor unit 50 includes the Hall IC 56 that outputs an electric signal corresponding to the magnetic field around the signal output portion 55. In such manner, a specific configuration of the rotating portion 51 and the signal output portion 55 of the sensor unit 50 is exemplarily shown.

(11) Further, according to the present embodiment, the pedal device 1 is a brake pedal device used in the brake-by-wire system 84, as shown in FIG. 2. Therefore, the ECU 85 can realize more accurate vehicle travel control based on the highly accurate electric signal output from the sensor unit 50 of the pedal device 1.

Further, according to the present embodiment, as shown in FIG. 6, the pedal pad 40 rotates within a predetermined rotation angle range. Further, the pedal pad 40 is arranged away from the rotating shaft support portion 13 of the housing 10 without coming into contact with the rotating shaft support portion 13 at any rotation angle within the predetermined rotation angle range. In such manner, even when an impact is applied to the pedal pad 40 from outside, i.e., from the driver 81, the impact is not directly transmitted from the pedal pad 40 to the rotating shaft support portion 13, thereby protecting the rotating shaft support portion 13 from the impact.

Further, according to the present embodiment, the pedal device 1 includes the base plate 20 provided on the surface of the housing 10 opposite to the pedal pad 40. Then, the housing 10 is fixed to the vehicle body (specifically, the floor 2 or the dash panel in the passenger compartment) via the base plate 20.

By providing the base plate 20 at a position between the housing 10 and the vehicle body in such manner, the rigidity of the housing 10 is increased. Therefore, deformation of the rotating shaft support portion 13 that rotatably supports the shaft 30 in the housing 10 is prevented. Therefore, the pedal device 1 can prevent positional shift between the rotating portion 51 and the signal output portion 55 of the sensor unit thereby increasing the detection accuracy of the pedal rotation angle.

Further, according to the present embodiment, as shown in FIG. 6, when the pedal pad 40 is in the non-stepping state, the pedal shaft center line CL is positioned with respect to the pedal pad 40 as follows. That is, in the non-stepping state of the pedal pad 40, the pedal shaft center line CL is positioned away in the front of the vehicle with regard to (a) a portion of the pedal pad 40 at the same height as the pedal shaft center line CL and (b) a portion of the pedal pad 40 provided in the vehicle downside than the pedal shaft center line CL in the vehicle vertical direction Db.

Thereby, it is possible to provide the sensor unit 50 in the space around the pedal shaft center line CL. When the pedal pad 40 is viewed from the driver 81, by arranging the sensor unit 50 at a position away from the back side of the pedal pad 40, it is possible to prevent troubles such as failure of the sensor unit 50 caused by an unintentional contact of the foot of the driver 81 with the sensor unit 50. Therefore, in the configuration in which the sensor unit 50 directly detects the pedal rotation angle, the strength safety of the sensor unit 50 can be ensured.

Further, according to the present embodiment, the pedal device 1 is configured such that the pedal pad 40 and the shaft 30 are fixed, and the center of the shaft portion 31 of the shaft 30 is the pedal shaft center line CL. The shaft portion 31 of the shaft 30 is rotatably supported by the rotating shaft support portion 13 of the housing 10. Therefore, compared to the structure in which the lower end portion of the pedal pad made of resin or the like is rotatably connected to the housing as disclosed in Patent Document 1 mentioned above, the strength and durability around the pedal shaft center line CL are improvable.

Further, according to the present embodiment, the pedal device 1 includes the full-close stopper 70 and the full-open stopper 71, as shown in FIGS. 4 and 5. The full-open stopper 71 is provided at a portion of the housing 10 on the front side of the vehicle relative to the rotating shaft support portion 13, and directly contacts the pedal pad 40 when the pedaling force applied to the pedal pad 40 by the driver 81 increases, and defines the maximum rotation position of the pedal pad 40. The full-close stopper 70 is provided at a portion of the housing 10 on the rear side of the vehicle relative to the rotating shaft support portion 13, and directly contacts the pedal pad 40 when the pedaling force of the driver 81 is not applied to the pedal pad 40, and defines the minimum rotation position of the pedal pad 40.

By defining the minimum rotation position and the maximum rotation position of the pedal pad 40 in such manner, the variation in the characteristics of the output signal with respect to the pedal rotation angle output from the sensor unit 50 is reduced, and the reliability of the output signal of the sensor unit 50 is improvable. Further, by restricting the rotation of the pedal pad 40 beyond a design value, the pedal pad 40 is prevented from rotating into an unintended range, and the strength safety of the pedal device 1 can be ensured.

Second Embodiment

The following describes the second embodiment of the present disclosure. The present embodiment is explained mainly with respect to points different from those of the first embodiment. Further, explanations of the same or equivalent portions as those in the above-described embodiment are omitted or simplified. The same applies to the description of embodiments to be described later. It should be noted that each configuration of a pedal device 1 is appropriately simplified in the drawings referred to in the second and subsequent embodiments.

Figure 8:
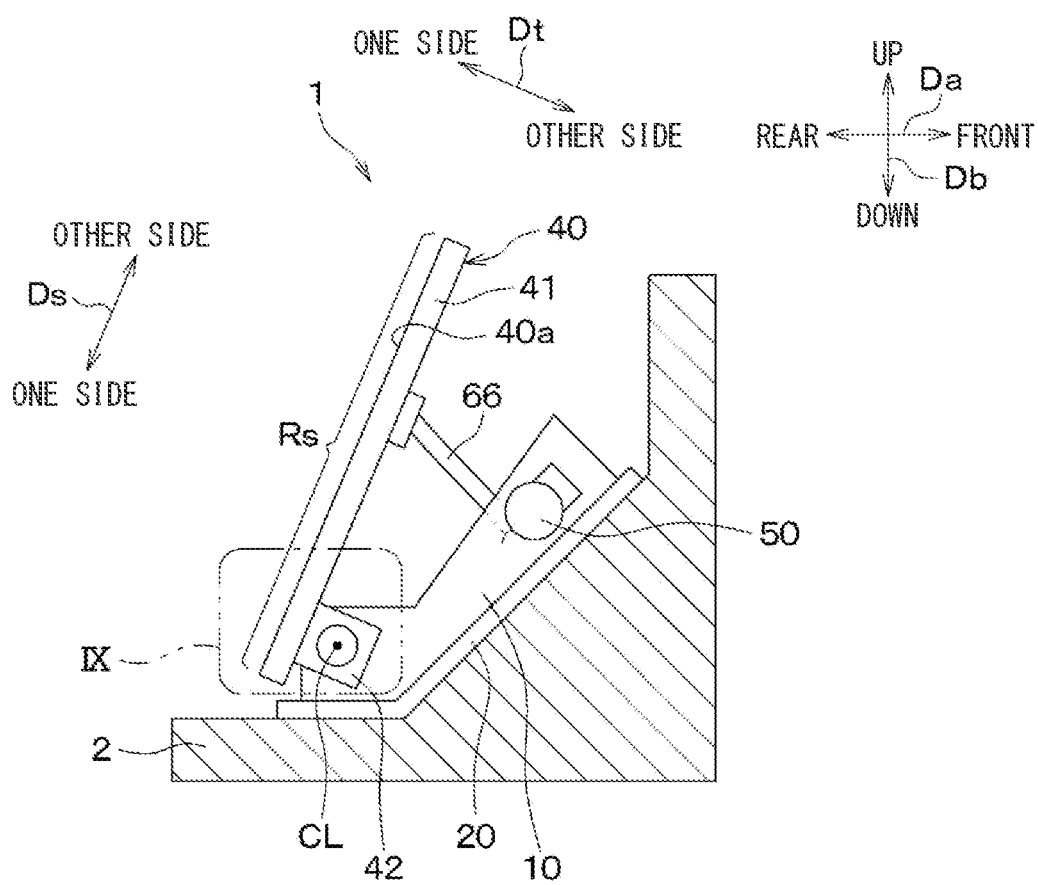
FIG. 8 is a diagram showing a schematic configuration of a pedal device according to a second embodiment.

As shown in FIG. 8, in the present embodiment, a plate thickness Tp of a pedal pad 40 is constant over the entire length of a plate portion 41. Therefore, the plate portion 41 of the pedal pad 40 is not provided with the thick portion 411 and the thin portion 412 described above. Further, a stepped surface 40*a* of the pedal pad 40 is formed over the entire length of the plate portion 41 in the pedal extending direction Ds, as indicated by a range Rs.

Figure 9:
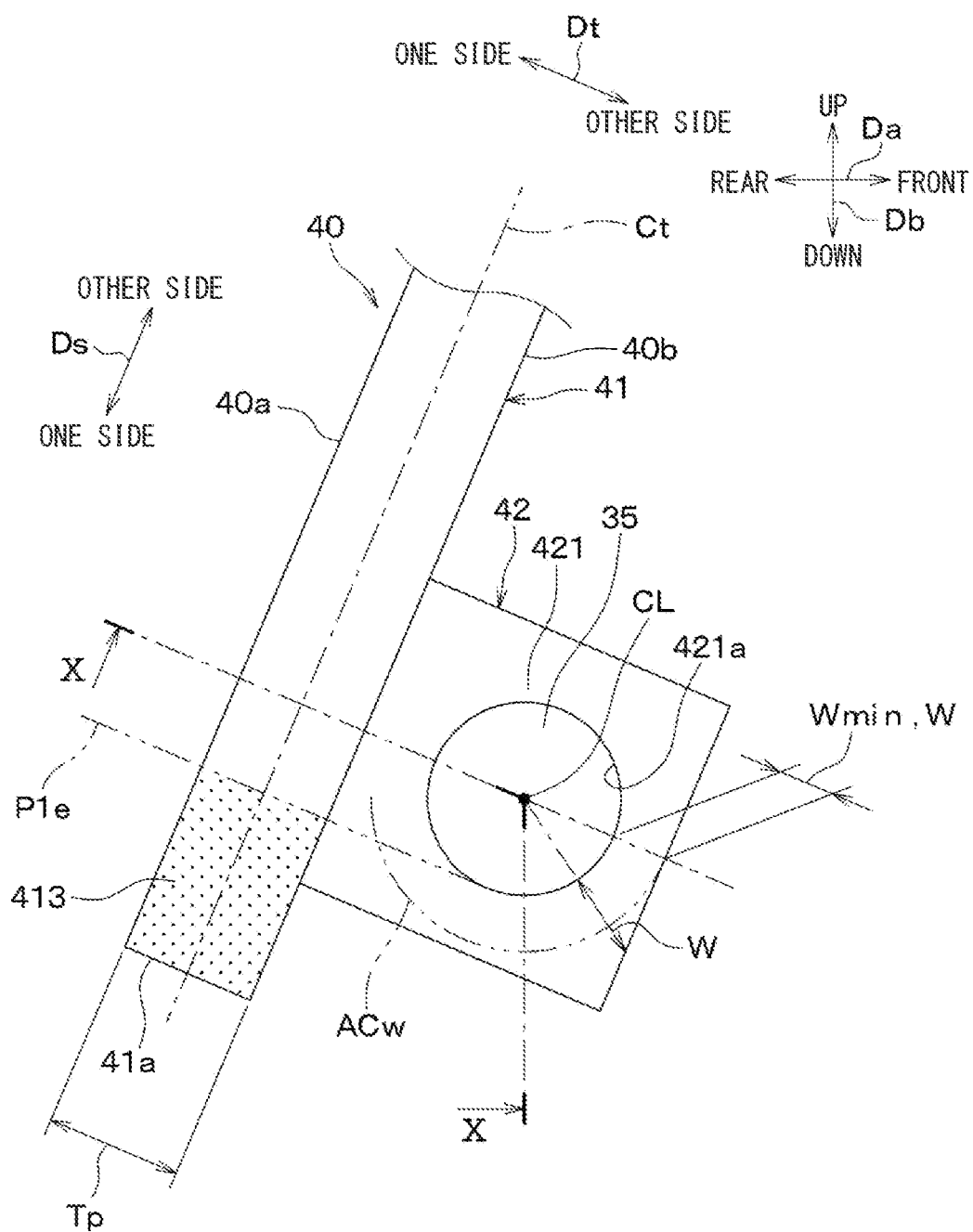
FIG. 9 is a partially-enlarged and extracted view showing a IX portion of FIG. 8 extracting a pedal pad and a pedal shaft of the pedal device in the second embodiment.
Figure 10:
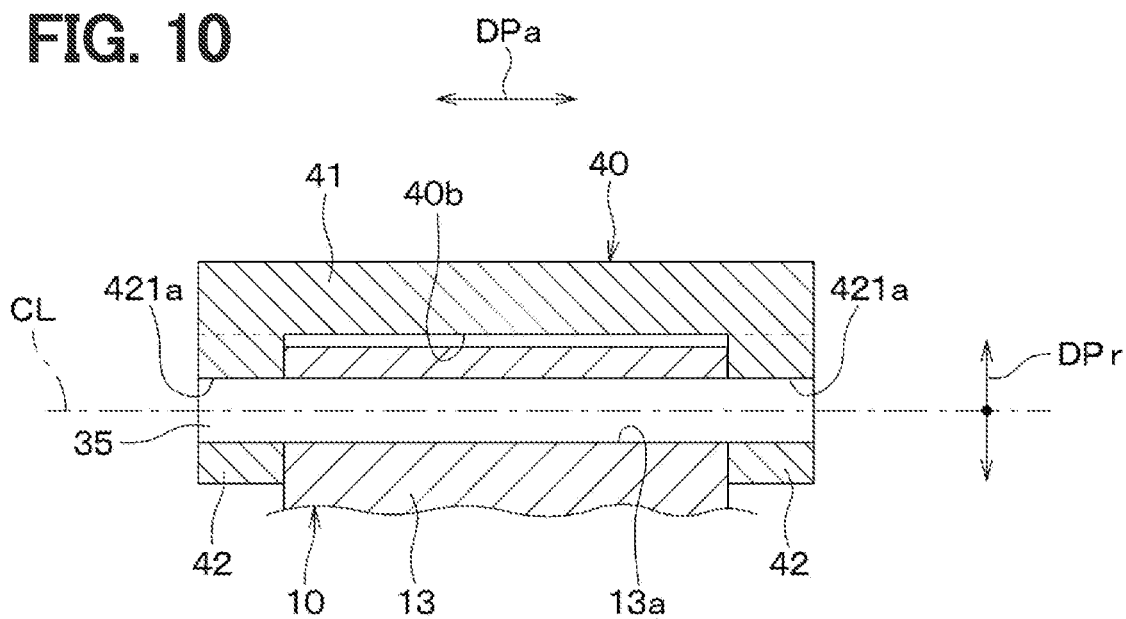
FIG. 10 is a cross-sectional view taken along a line X-X of FIG. 9.
Figure 11:
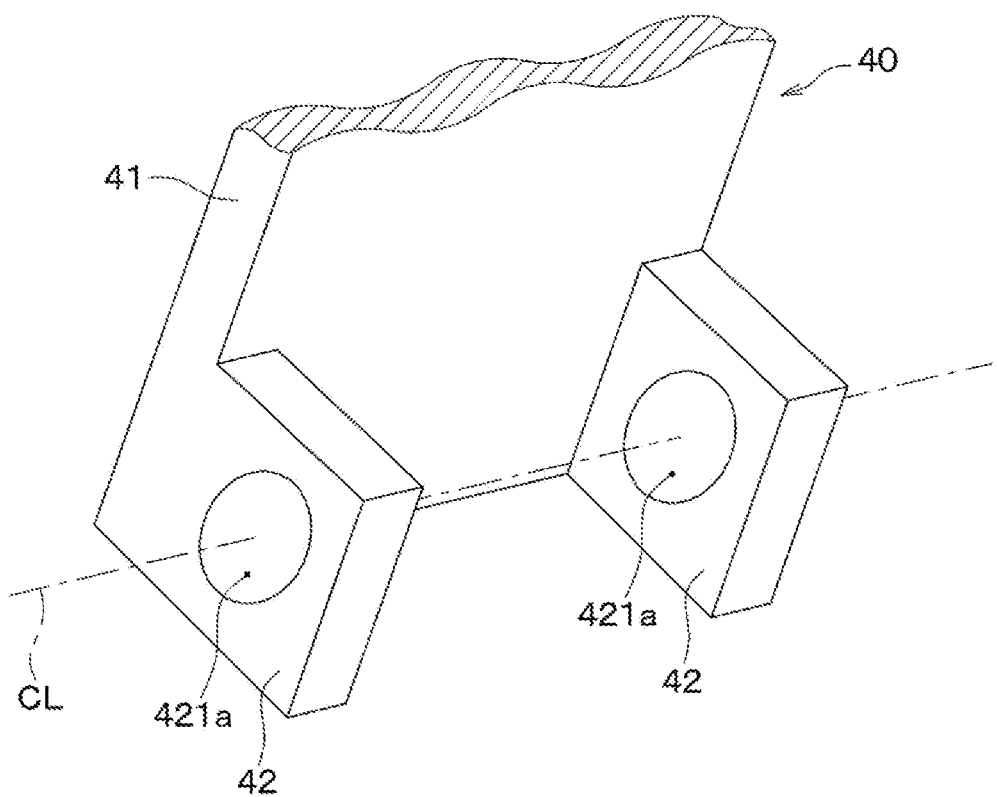
FIG. 11 is a perspective view schematically showing a portion of a single component of the pedal pad that is connected to the pedal shaft according to the second embodiment.

Further, as shown in FIGS. 8 to 10, the pedal pad 40 of the present embodiment includes a pair of back surface projections 42 projecting from a pedal back surface 40*b* toward the other side in a pedal plate thickness direction Dt, in addition to the plate portion 41. The pair of back surface projections 42 are arranged in the proximity of the plate one end surface 41*a*, and are arranged away from each other in the pedal shaft direction DPa. For example, as shown in FIGS. 10 and 11, the pair of back surface projections 42 are arranged at both ends of the width of the plate portion 41 in the pedal shaft direction DPa.

As shown in FIGS. 9 and 10, each of the pair of back surface projections 42 has a hole-forming portion 421, and inside each of the hole-forming portions 421, an insertion hole 421*a* centering on the pedal shaft center line CL and penetrating therethrough in the pedal shaft direction DPa is formed respectively, about the pedal shaft center line CL. The rotating shaft support portion 13 forming a part of the housing 10 is arranged at a position between the pair of back surface projections 42, and an inside of the rotating shaft support portion 13 has the rotating shaft hole 13*a* formed therein.

With respect to the pair of insertion holes 421*a* of the pedal pad 40 and the rotating shaft hole 13*a* of the rotating shaft support portion 13 provided between the pair of back surface projections 42, a pedal shaft 35 made of metal is inserted, centering on the pedal shaft center line CL and extending in the pedal shaft direction DPa.

The pedal shaft 35 corresponds to the shaft portion 31 of the shaft 30 in the first embodiment. The pedal device 1 of the present embodiment includes the pedal shaft 35 instead of the shaft 30 (see FIG. 4) of the first embodiment. Moreover, since the shaft 30 is not provided in the present embodiment, the fixing metal bracket 34 (see FIG. 4) is also not provided.

In the present embodiment, the pedal shaft 35 is fixed to the pair of hole forming portions 421 of the pedal pad 40 so as not to rotate relative to each other, and is supported by the rotating shaft support portion 13 so as to be rotatable about the pedal shaft center line CL. By inserting the pedal shaft 35 into the insertion hole 421*a* and the rotating shaft hole 13*a* in such manner, the pedal pad 40 is connected to the pedal shaft 35, and is rotatably connected to the rotating shaft support portion 13 via the pedal shaft 35. The pedal pad 40 and the pedal shaft 35 rotate together about the pedal shaft center line CL.

Further, as shown in FIG. 9, in the present embodiment, since the back surface projection 42 has a rectangular shape and the insertion hole 421*a* has a circular cross section, a radial width W of the hole forming portion 421 around and outside the insertion hole 421*a* along the pedal shaft radial direction DPr is not constant. In the present embodiment, for example, a portion of the hole forming portion 421 on the other side in the pedal plate thickness direction Dt with respect to the insertion hole 421*a* has a minimum radial width Wmin, which is the smallest among the radial widths W that are not constant.

Further, the plate portion 41 of the pedal pad 40 has, on one side of the pedal shaft 35 in the pedal extending direction Ds, a portion 413 that is farther away from the pedal shaft 35 than its minimum radial width Wmin. In FIG. 9, an arc ACw indicates a position away from the pedal shaft 35 at the same distance as the minimum radial width Wmin. Therefore, the portion 413 of the plate portion 41 which is farther away from the pedal shaft 35 than the minimum radial width Wm in is positioned radially outside the arc ACw.

In the present embodiment, a portion of the plate portion 41 that forms one side of the pedal extending direction Ds from a one-end-side edge position P1*e* of the pedal shaft 35, that is, a portion hatched with dots in FIG. 9 corresponds to the portion 413 farther away from the pedal shaft 35 than the minimum radial width Wmin.

As shown in FIG. 8, a sensor unit 50 of the present embodiment is arranged in a housing 10 at a position different from that of the first embodiment. Specifically, the sensor unit 50 is arranged away from the pedal shaft center line CL and fixed to the housing 10.

Since a connecting rod 66 displaces in conjunction with the rotational movement of the pedal pad 40, the amount of displacement of the connecting rod 66 corresponds to the pedal rotation angle. Therefore, the sensor unit 50 detects the amount of displacement of the connecting rod 66 as the pedal rotation angle. As the sensor unit 50 of the present embodiment, various types of sensors such as a non-contact sensor using a Hall IC 56 similar to that of the first embodiment may be used.

(1) As described above, according to the present embodiment, as shown in FIG. 9, the plate portion 41 of the pedal pad 40 has the portion 413 farther away from the pedal shaft 35 than the minimum radial width Wmin, on one side of the pedal extending direction Ds relative to the pedal shaft 35. Accordingly, the portion 413 of the plate portion 41 of the pedal pad 40 is arranged at a position between the foot of the driver 81 and the pedal shaft 35 in the vehicle 80. Therefore, the pedal shaft 35 and the portions around the pedal shaft 35 (for example, the rotating shaft support portion 13 and the hole forming portion 421) are protectable from the foot of the driver 81 stepping on the pedal pad 40 by the plate portion 41 of the pedal pad 40.

The present embodiment is similar to the first embodiment, except for the above-described parts. Thus, the present embodiment can achieve the advantages obtained by the configuration in common with the first embodiment described above in a similar manner as in the first embodiment.

Third Embodiment

The following describes the third embodiment of the present disclosure. The present embodiment is explained mainly with respect to portions different from those of the second embodiment.

Figure 12:
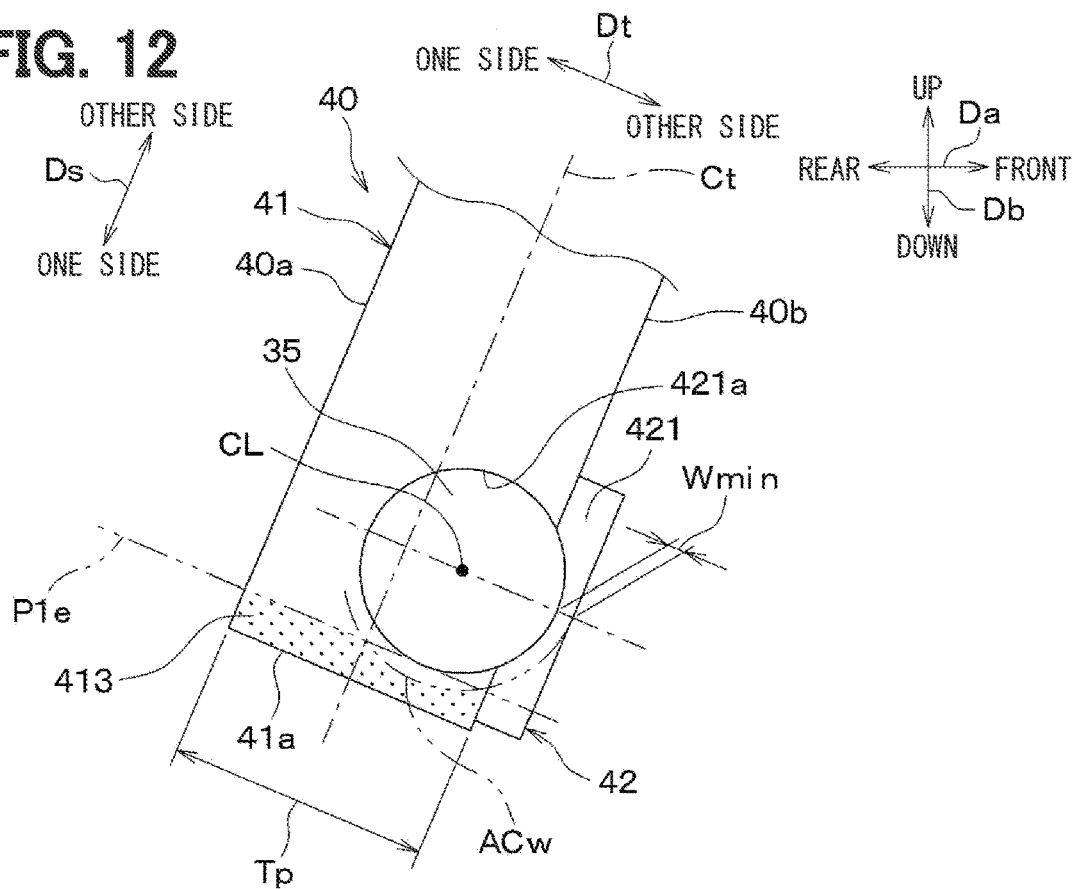
FIG. 12 is a partially-enlarged and extracted view of a IX portion of FIG. 8 extracting a pedal pad and a pedal shaft, corresponding to FIG. 9, according to a third embodiment.

As shown in FIG. 12, in the present embodiment, a pair of back surface projections 42 of a pedal pad 40 protrude from a pedal back surface 40*b* toward the other side in a pedal plate thickness direction Dt, as in the second embodiment. However, unlike the second embodiment, in the present embodiment, a projection height of the pair of back surface projections 42 projecting from the pedal back surface 40b is much smaller than in the second embodiment.

Therefore, an insertion hole 421a into which a pedal shaft 35 is inserted is formed across both of the back surface projection 42 and the plate portion 41. That is, a hole forming portion 421 having the insertion hole 421a formed therein is formed in both of the back surface projection 42 and the plate portion 41. Then, a portion of the pedal shaft 35, but not the entire pedal shaft 35, is provided on the other side of the pedal plate thickness direction Dt relative to the pedal back surface 40b.

In FIG. 12, similarly to FIG. 9 described above, a position away from the pedal shaft 35 at the same distance as the minimum radial width Wmin of the hole forming portion 421 is indicated by the arc ACw. Also, in the present embodiment, the plate portion 41 of the pedal pad 40 has a portion 413 (that is, the portion hatched with dots in FIG. 12) farther away from the pedal shaft 35 than the minimum radial width Wmin, on one side of the pedal shaft 35 in the pedal extending direction Ds.

Further, as shown in FIGS. 12 and 9, in the present embodiment, the pedal shaft center line CL is closer to the center of plate thickness Ct of the plate portion 41 than in the second embodiment. However, even in the present embodiment, similar to the second embodiment, the pedal shaft center line CL is shifted from the center of plate thickness Ct of the plate portion 41 toward the other side in the pedal plate thickness direction Dt.

Aside from the above-described aspects, the present embodiment is the same as the second embodiment. Further, in the present embodiment, effects similar to those of the second embodiment described above can be obtained in the same manner as in the second embodiment.

Fourth Embodiment

The following describes the fourth embodiment of the present disclosure. The present embodiment is explained mainly with respect to portions different from those of the second embodiment.

Figure 13:
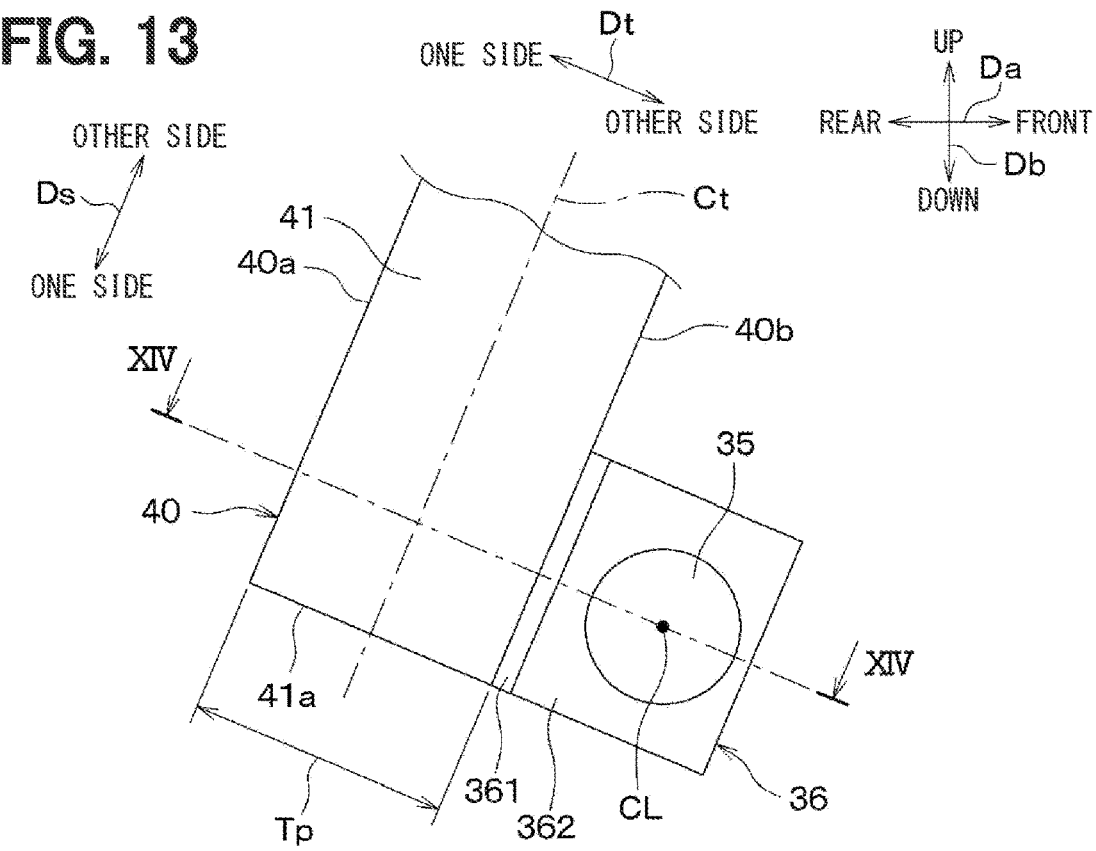
FIG. 13 is a partially-enlarged and extracted view of a IX portion of FIG. 8 extracting a pedal pad, a pedal shaft and a connecting member, corresponding to FIG. 9, according to a fourth embodiment.
Figure 14:
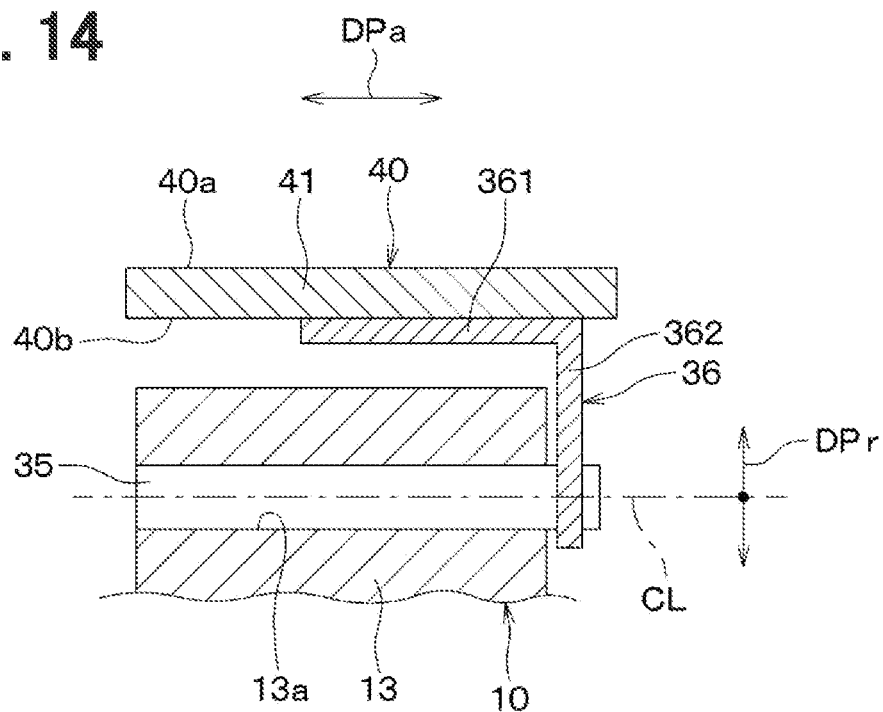
FIG. 14 is a cross-sectional view taken along a line XIV-XIV in FIG. 13.

As shown in FIGS. 13 and 14, in the present embodiment, a pedal pad 40 does not have a pair of back surface projections 42, and instead the pedal device 1 is provided with a connecting member 36 for connecting the pedal pad 40 and the pedal shaft 35. The connecting member 36 is formed by bending a metal plate into an L shape.

The connecting member 36 has a fixing portion 361 and a connecting portion 362 that are integrally constructed. The fixing portion 361 has a shape extending along the pedal back surface 40b and is fixed to the pedal back surface 40b. The fixing portion 361 and the pedal pad 40 are arranged apart from a rotating shaft support portion 13 of a housing 10 in the pedal shaft radial direction DPr.

The connecting portion 362 extends in the pedal shaft radial direction DPr from one end portion of a pedal shaft 35 to the fixing portion 361, and is fixed to the one end portion of the pedal shaft 35. That is, the connecting portion 362 connects the fixing portion 361 and the pedal shaft 35 so as not to rotate relative to each other.

In such manner, the pedal pad 40, the connecting member 36, and the pedal shaft 35 rotate integrally about the pedal shaft center line CL. Even in the present embodiment, the pedal shaft 35 is inserted into the rotating shaft hole 13a of the rotating shaft support portion 13, and is supported by the rotating shaft support portion 13 so as to be rotatable about the pedal shaft center line CL.

Aside from the above-described aspects, the present embodiment is the same as the second embodiment. Further, in the present embodiment, effects similar to those of the second embodiment described above can be obtained in the same manner as in the second embodiment.

Fifth Embodiment

The following describes the fifth embodiment of the present disclosure. The present embodiment is explained primarily with respect to portions different from those of the second embodiment.

Figure 15:
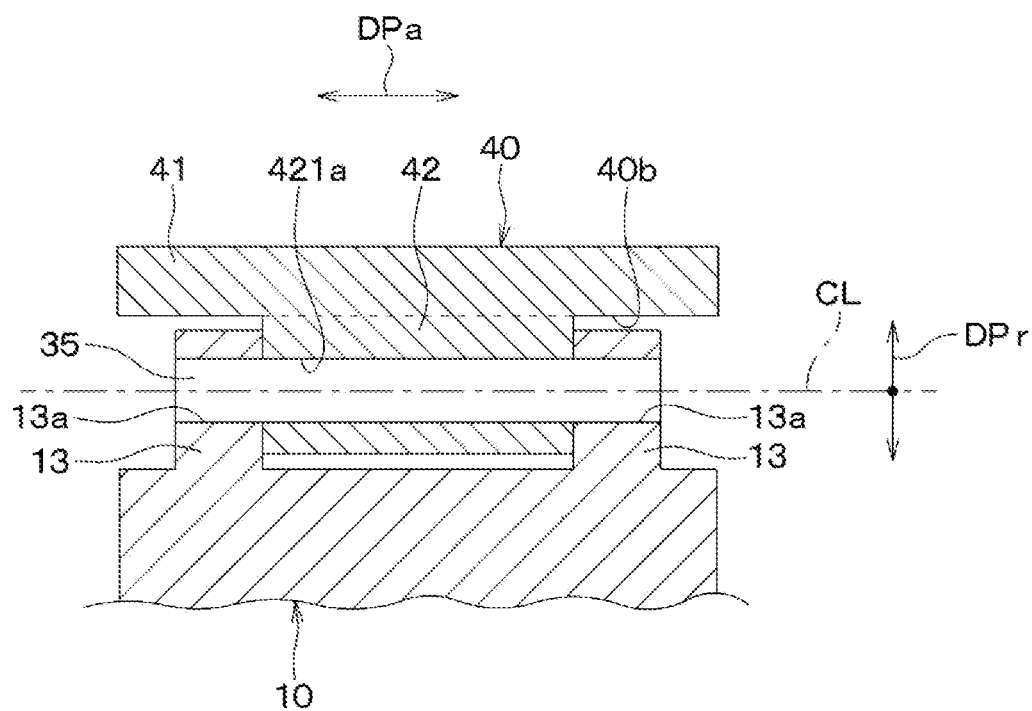
FIG. 15 is a cross-sectional view showing a section taken along the line X-X of FIG. 9, corresponding to FIG. 10, according to a fifth embodiment.
Figure 16:
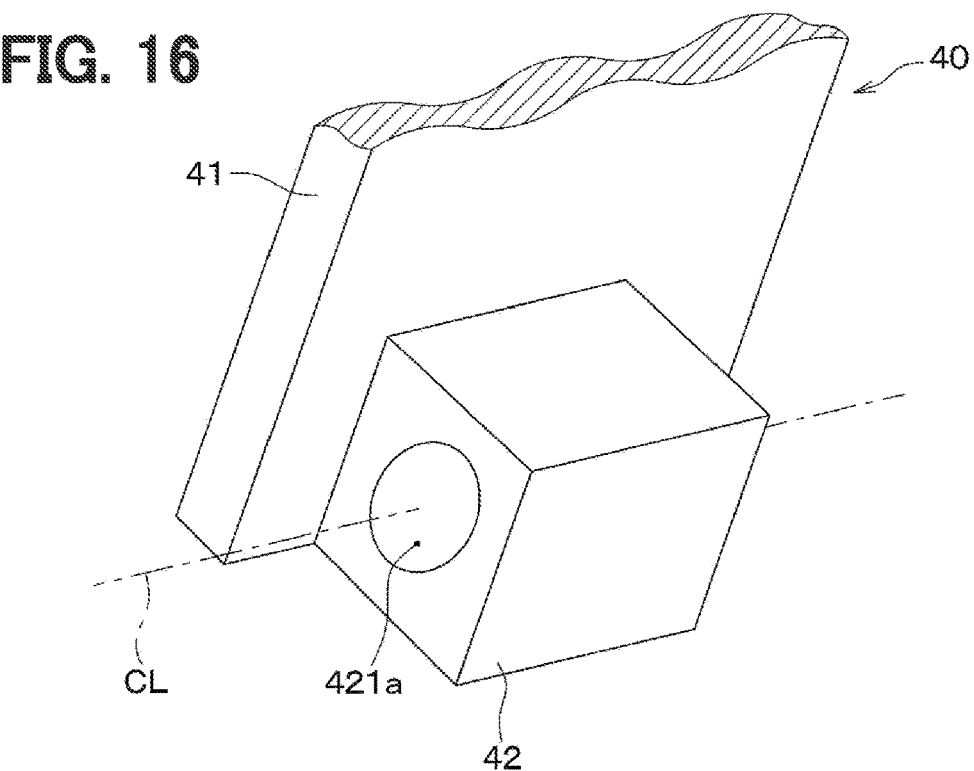
FIG. 16 is a perspective view schematically showing a portion of a single component of a pedal pad that is connected to a pedal shaft, corresponding to FIG. 11, according to the fifth embodiment.

As shown in FIGS. 15 and 16, in the present embodiment, unlike the second embodiment, a pair of the back surface projection 42 of the pedal pad 40 is not provided, but a single back surface projection 42 is provided at a center of the width of a plate portion 41 of a pedal pad 40 in the pedal shaft direction DPa. The lateral width of the back surface projection 42 of the present embodiment along the pedal shaft direction DPa is much greater than the diameter of the pedal shaft 35.

A housing 10 of the present embodiment has a pair of rotating shaft support portions 13. That is, the housing 10 has two rotating shaft support portions 13. The back surface projection 42 of the pedal pad 40 is arranged at a position between the pair of rotating shaft support portions 13.

The pedal shaft 35 is inserted into the rotating shaft hole 13a of each of the pair of rotation shaft support portions 13 and the insertion hole 421a of the back surface projection 42 provided at a position between the pair of rotation shaft support portions 13. In the present embodiment, the pedal shaft 35 is fixed to the back surface projection 42 of the pedal pad 40 so as not to be relatively rotatable, and is connected to each of the pair of rotating shaft support portions 13 to be rotatable about the pedal shaft center line CL. That is, the pedal pad 40 and the pedal shaft 35 are rotatably supported by the pair of rotating shaft support portions 13 about the pedal shaft center line CL, and integrally rotate about the pedal shaft center line CL.

Aside from the above-described aspects, the present embodiment is the same as the second embodiment. Further, in the present embodiment, effects similar to those of the second embodiment described above can be obtained in the same manner as in the second embodiment.

Sixth Embodiment

The following describes the sixth embodiment of the present disclosure. The present embodiment is explained primarily with respect to portions different from those of the second embodiment.

Figure 17:
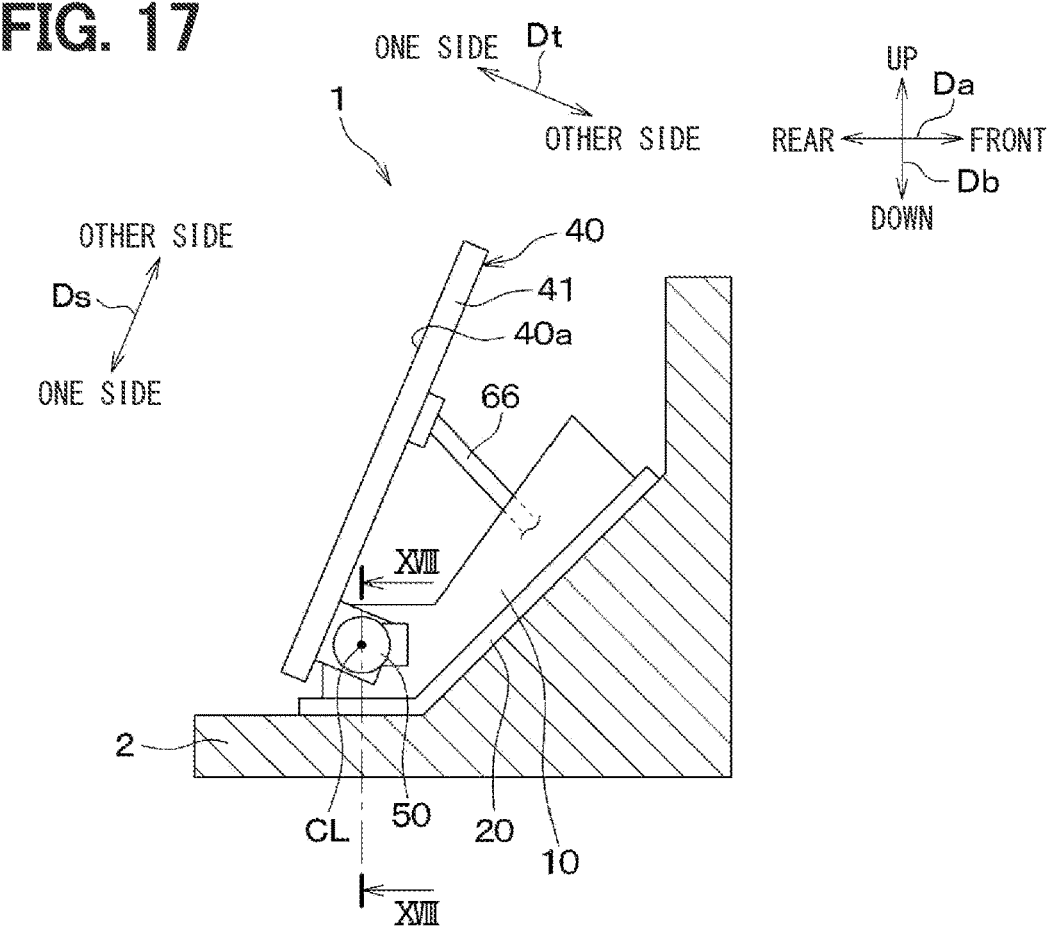
FIG. 17 is a diagram schematically showing a pedal device, corresponding to FIG. 8, according to a sixth embodiment.
Figure 18:
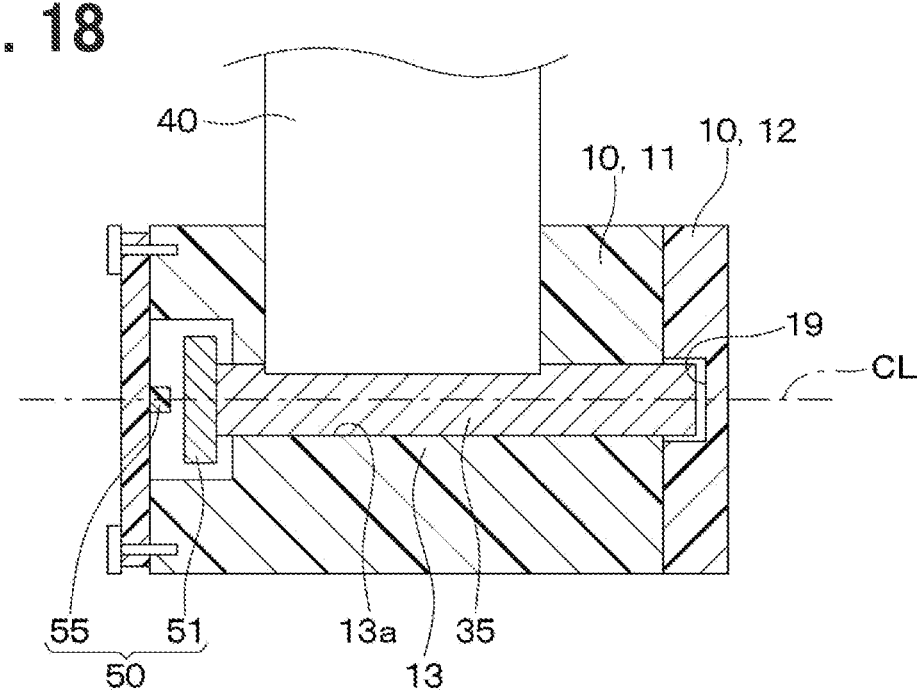
FIG. 18 is a cross-sectional view in simplified form regarding a section taken along a line XVIII-XVIII of FIG. 17.

As shown in FIGS. 17 and 18, the present embodiment differs from the second embodiment in the arrangement of a sensor unit 50. Specifically, the sensor unit 50 of the present embodiment is provided on the pedal shaft center line CL as in the first embodiment.

As in the second embodiment, a pedal shaft 35 is fixed to a pedal pad 40 in the present embodiment, so that the pedal shaft 35 and the pedal pad 40 rotate integrally about the pedal shaft center line CL. The pedal shaft 35 is supported by a rotating shaft support portion 13 so as to be rotatable about the pedal shaft center line CL.

In the present embodiment, the pedal rotation angle is directly detected by the sensor unit 50 as in the first embodiment. An end portion of the pedal shaft 35 provided on the side opposite to the sensor unit 50 side is inserted into a hole 19 provided in a housing cover 12.

As shown in FIG. 18, the sensor unit 50 has a rotating portion 51 provided on the pedal shaft 35 and a signal output portion 55 provided on the housing 10 for outputting a signal corresponding to the phase of the rotating portion 51. In the present embodiment, as in the first embodiment, a non-contact sensor is employed, which is capable of detecting the pedal rotation angle with the rotating portion 51 and the signal output portion 55 provided in a non-contact state.

Figure 19:
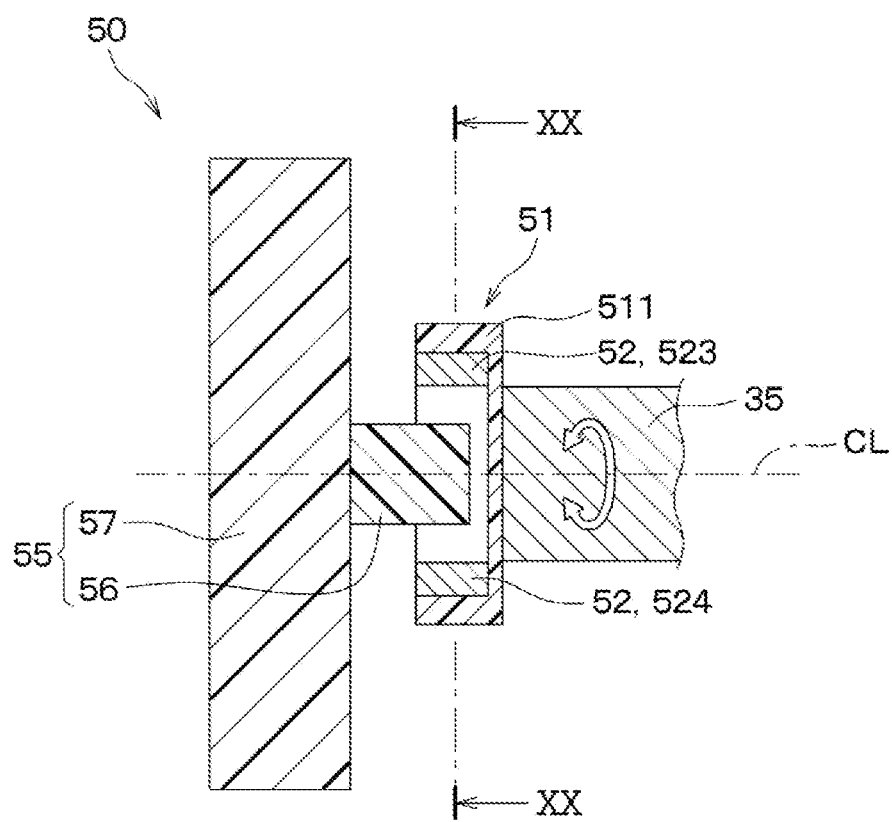
FIG. 19 is a cross-sectional view showing a sensor unit provided in the pedal device according to the sixth embodiment.
Figure 20:
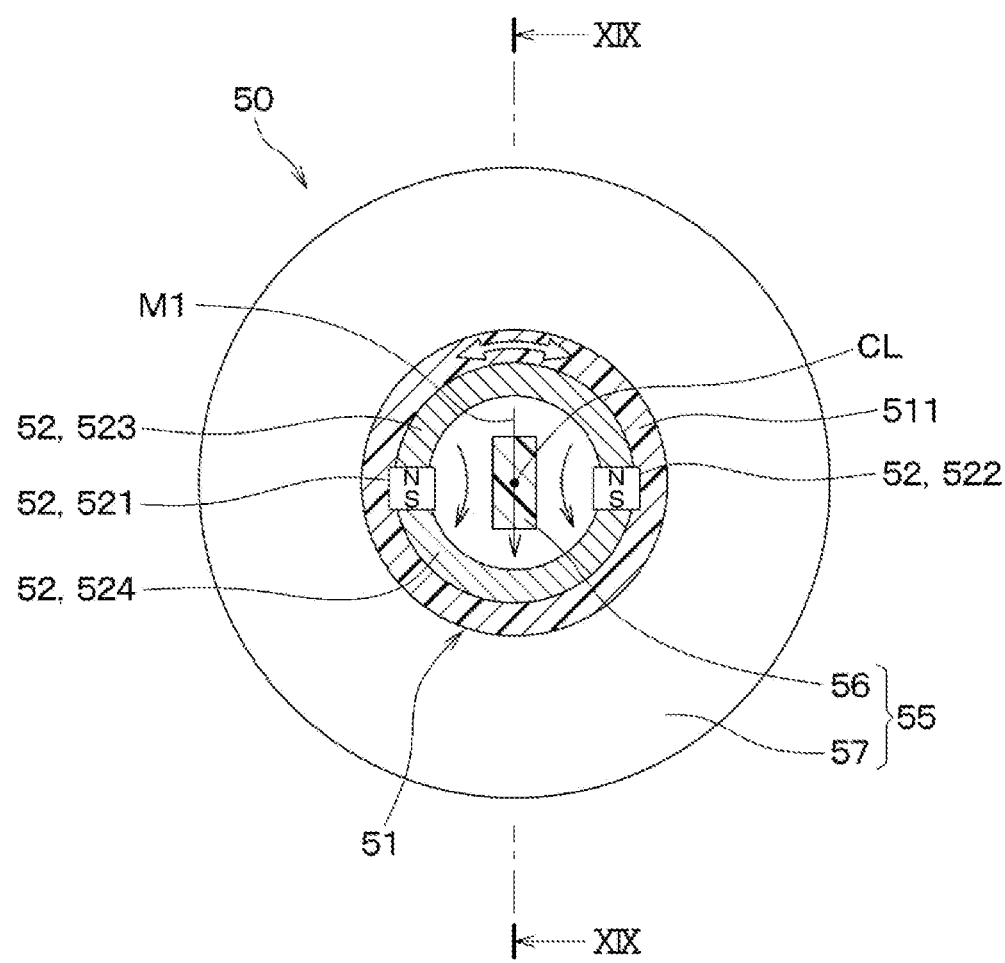
FIG. 20 is a cross-sectional view taken along a line XX-XX of FIG. 19.

As shown in FIGS. 19 and 20, the rotating portion 51 includes a magnetic circuit 52 formed cylindrically by magnets 521 and 522, yokes 523 and 524, and the like. Specifically, one yoke 523 formed in a semicircular shape connects the north poles of the two magnets 521 and 522, and the other yoke 524 connects the south poles of the two magnets 521 and 522. Therefore, as indicated by an arrow M1 in FIG. 20, a magnetic field is formed in which the magnetic flux flies from one yoke 523 to the other yoke 524. That is, the magnetic circuit 52 forms a magnetic field in which magnetic flux flows so as to intersect the pedal shaft center line CL. A rotating portion 51 including the magnetic circuit 52 is fixed to an end portion of the pedal shaft 35 and rotates together with the pedal shaft 35. The center of rotation of the rotating portion 51 is the same as the pedal shaft center line CL.

On the other hand, the signal output portion 55 includes a Hall IC 56, a sensor holding portion 57 for molding the Hall IC 56, and the like. The sensor holding portion 57 is positioned and fixed to the housing 10 by a positioning structure such as engagement and screws. When the rotating portion 51 rotates about the pedal shaft center line CL together with the pedal shaft 35, the direction of the magnetic flux that flies between the two yokes 523 and 524 changes, and the density of the magnetic flux that passes through the magneto-sensitive surface of the Hall element of the Hall IC 56 accordingly changes. Therefore, the signal output portion 55 outputs an electric signal corresponding to the pedal rotation angle. Note that FIG. 19 shows a cross section taken along a line XIX-XIX in FIG. 20.

Aside from the above-described aspects, the present embodiment is the same as the second embodiment. Further, in the present embodiment, effects similar to those of the second embodiment described above can be obtained in the same manner as in the second embodiment.

Seventh Embodiment

The following describes the seventh embodiment of the present disclosure. In the present embodiment, a part of the configuration of the sensor unit 50 is changed from the first embodiment, and the rest is the same as in the first embodiment.

Figure 21:
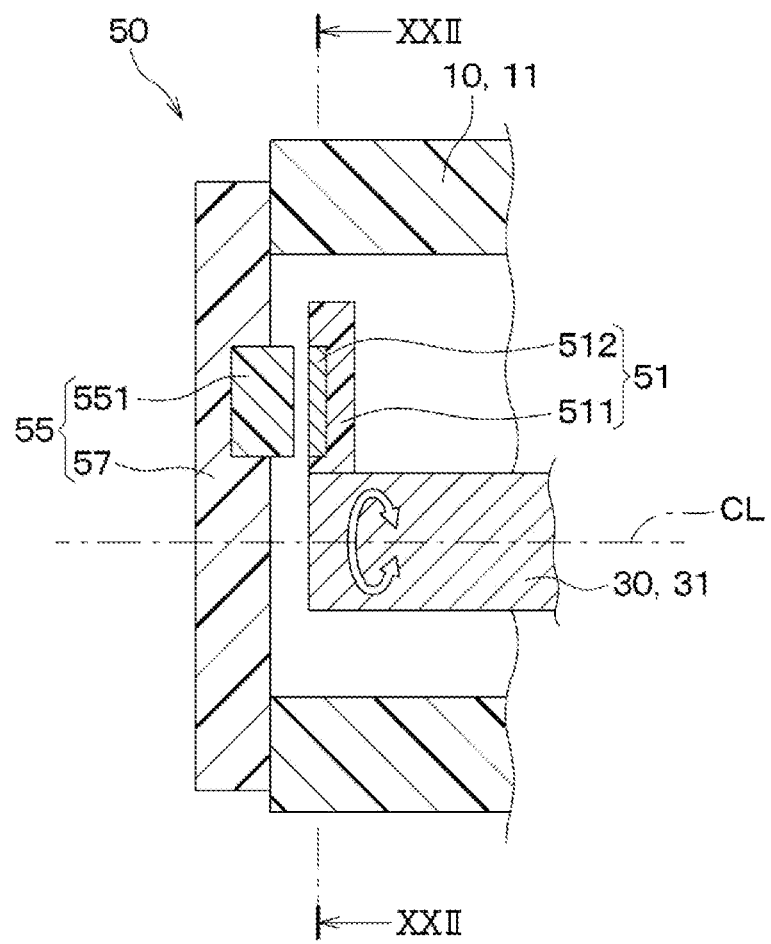
FIG. 21 is a cross-sectional view showing a sensor unit provided in a pedal device according to a seventh embodiment.
Figure 22:
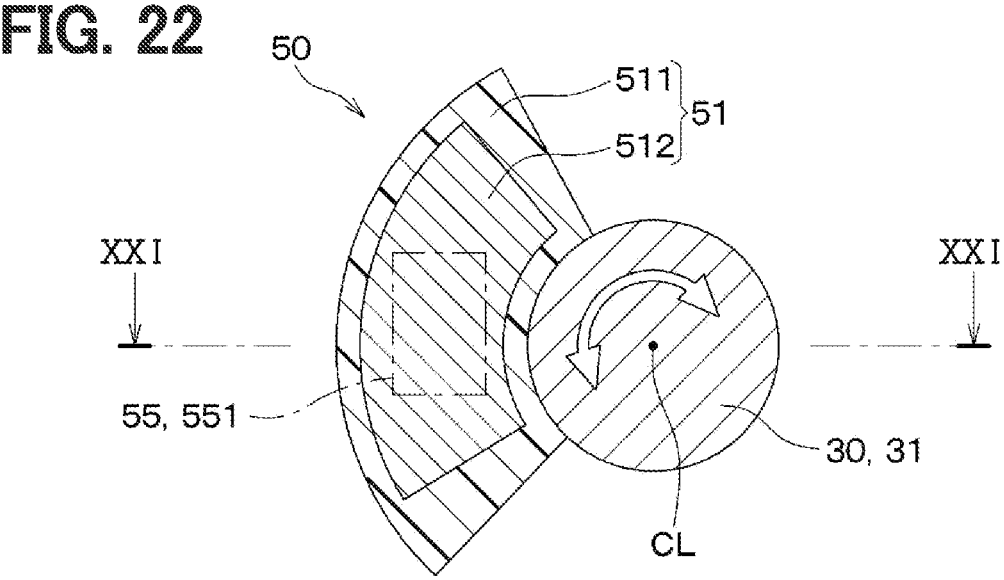
FIG. 22 is a cross-sectional view taken along a line XXII-XXII of FIG. 21.

As shown in FIGS. 21 and 22, a pedal device 1 of the present embodiment employs an inductive sensor unit 50 as the non-contact sensor unit 50, for example. Such a sensor unit 50 also has a rotating portion 51 provided on a shaft portion 31 of a shaft 30, and a signal output portion 55 provided at a housing 10 for outputting a signal corresponding to the phase of the rotating portion 51. FIG. 21 shows a cross section taken along a line XXI-XXI of FIG. 22.

In the rotating portion 51, for example, a detected portion 512 to be detected is insert-molded in a holding portion 511 provided in a fan shape on a radial outside of the shaft portion 31 of the shaft 30. On the other hand, the signal output portion 55 is formed by insert-molding a sensor portion 551 in a sensor holding portion 57 fixed to the housing 10, for example. In FIG. 22, the position of the sensor portion 551 of the signal output portion 55 when the shaft 30 and a pedal pad 40 are at a predetermined rotation angle is indicated by a one-dot chain line. When the shaft 30 and the pedal pad 40 rotate, the position of the detected portion 512 of the rotating portion 51 fixed to the shaft portion 31 of the shaft 30 changes with respect to the position of the sensor portion 551. The sensor portion 551 is configured to output an electric signal corresponding to the position of the detected portion 512. Therefore, the signal output portion 55 outputs an electric signal corresponding to the pedal rotation angle.

Due to such a configuration of the sensor unit 50, in the present embodiment, the detected portion 512 and the sensor portion 551 of the sensor unit are positioned away from the pedal shaft center line CL in the pedal shaft radial direction DPr (see FIG. 7).

The present embodiment is similar to the first embodiment, except for the above-described aspects. Thus, the present embodiment can achieve the advantages obtained by the configuration in common with the first embodiment described above in a similar manner as in the first embodiment.

Eighth Embodiment

The eighth embodiment is described. The present embodiment also partially changes the configuration of a sensor unit 50 from the first embodiment, and the other parts are the same as the first embodiment.

Figure 23:
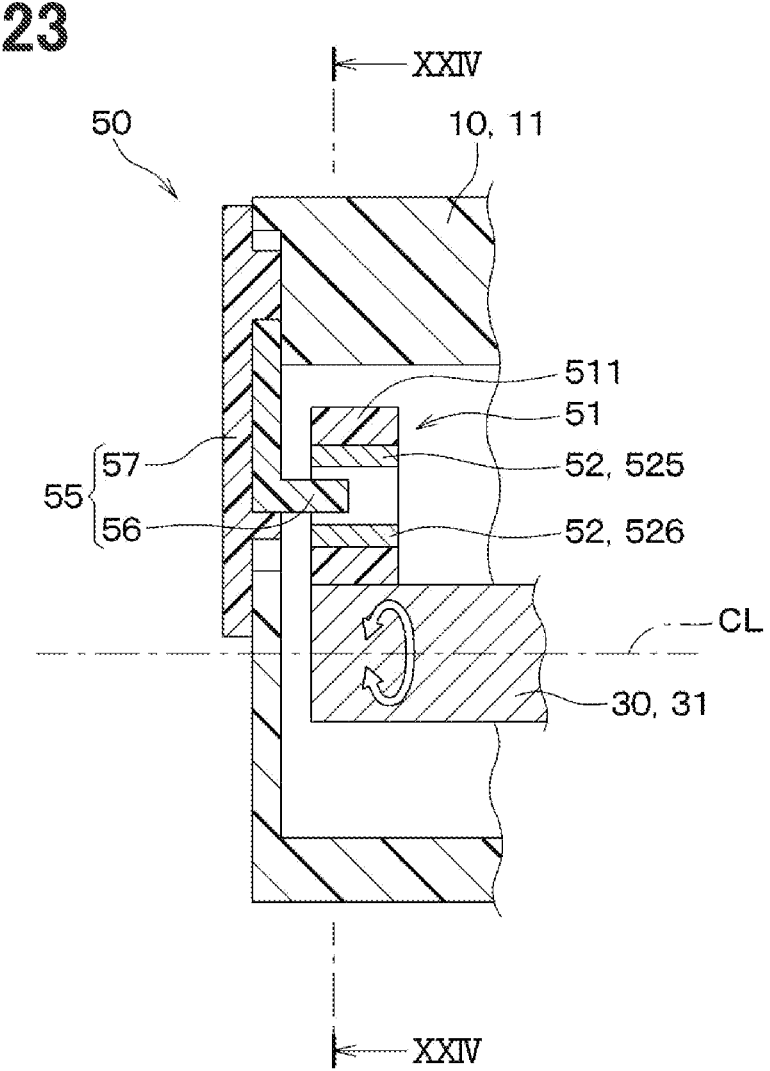
FIG. 23 is a cross-sectional view showing a sensor unit provided in a pedal device according to an eighth embodiment.
Figure 24:
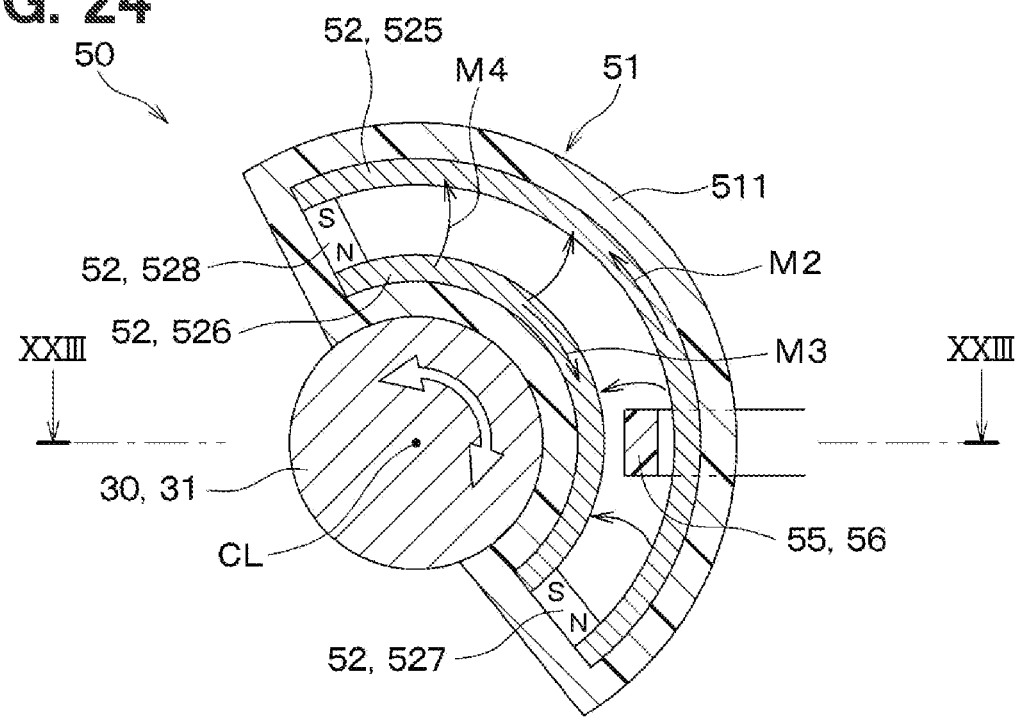
FIG. 24 is a cross-sectional view taken along a line XXIV-XXIV of FIG. 23.

As shown in FIGS. 23 and 24, a pedal device 1 of the present embodiment also employs a Hall IC 56 as a non-contact sensor unit 50. Such a sensor unit 50 also has a rotating portion 51 provided on a shaft portion 31 of a shaft 30, and a signal output portion 55 provided at a housing 10 to output a signal corresponding to a phase of the rotating portion 51. FIG. 23 shows a cross section taken along a line XXIII-XXIII of FIG. 24.

The rotating portion 51 includes, for example, a magnetic circuit 52 formed by two arc-shaped yokes 525 and 526 provided radially outside the shaft portion 31 of the shaft 30 and first and second magnets 527 and 528 provided at both ends of the two yokes 525 and 526. A predetermined space is provided between the two yokes 525 and 526. The N pole of the first magnet 527 is connected to one end of the yoke 525 on the outer peripheral side, and the S pole of the second magnet 528 is connected to the other end thereof. The S pole of the first magnet 527 is connected to one end of the yoke 526 on the inner peripheral side, and the N pole of the second magnet 528 is connected to the other end thereof. Therefore, as indicated by arrows M2 to M4 in FIG. 24, magnetic flux flows through the two yokes 525 and 526, and a magnetic field is formed in which leakage magnetic flux flies in the space between the two yokes 525 and 526. The rotating portion 51 is fixed to the end portion of the shaft portion 31 of the shaft 30 and rotates together with the shaft 30. Therefore, the center of rotation of the rotating portion 51 is the same as the pedal shaft center line CL.

On the other hand, the signal output portion 55 includes a Hall IC 56 as a sensor unit, a sensor holding portion 57 for molding the Hall IC 56, and the like. The sensor holding portion 57 is positioned and fixed to the housing 10 by a positioning structure such as engagement and screws. When the rotating portion 51 rotates about the pedal shaft center line CL together with the shaft 30, the density of magnetic flux and the direction of the magnetic flux passing through the magneto-sensitive surface of the Hall element of the Hall IC 56 change. Therefore, the signal output portion 55 outputs an electric signal corresponding to the pedal rotation angle.

Due to such a configuration of the sensor unit 50, in the present embodiment, the rotating portion 51 of the sensor unit 50 and the Hall IC 56 as a sensor unit are positioned away from the pedal shaft center line CL in the pedal shaft radial direction DPr (see FIG. 7).

The present embodiment is similar to the first embodiment, except for the above-described aspects. Thus, the present embodiment can achieve the advantages obtained by the configuration in common with the first embodiment described above in a similar manner as in the first embodiment.

Ninth Embodiment

The ninth embodiment is described. The present embodiment also partially changes the configuration of the sensor unit 50 from the first embodiment, and the other parts are the same as the first embodiment.

Figure 25:
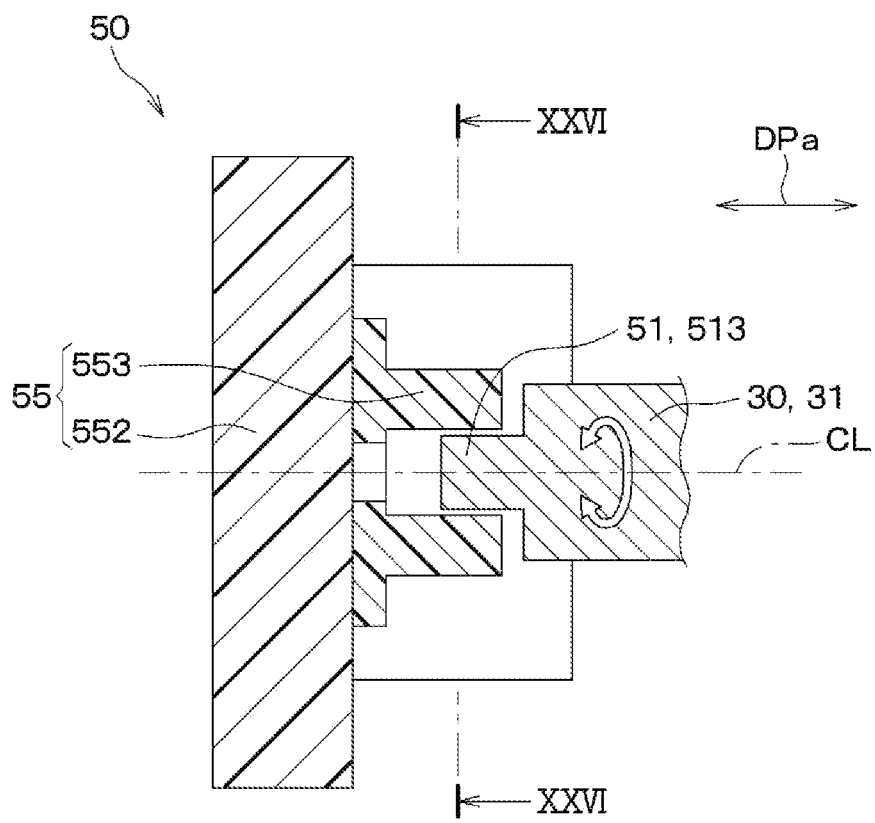
FIG. 25 is a cross-sectional view showing a sensor unit provided in a pedal device according to a ninth embodiment.
Figure 26:
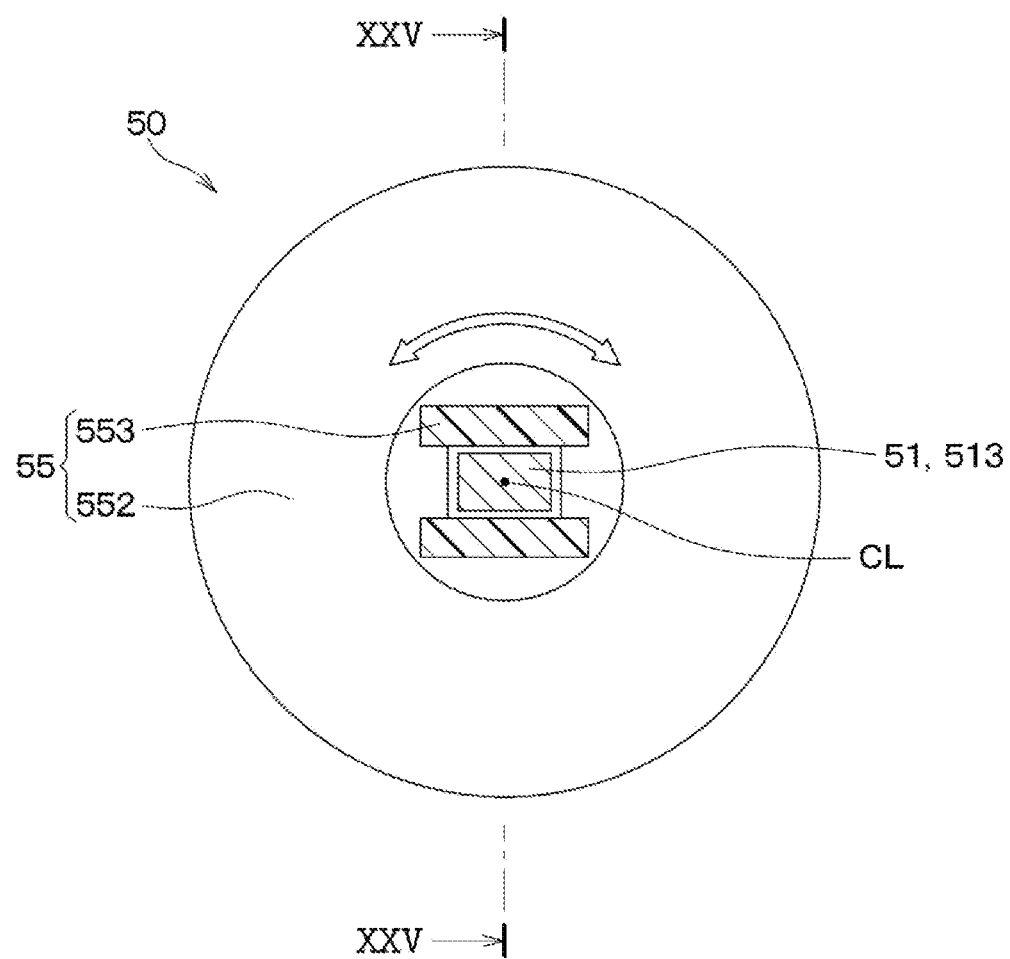
FIG. 26 is a cross-sectional view taken along a line XXVI-XXVI of FIG. 25.

As shown in FIGS. 25 and 26, a pedal device 1 of the present embodiment employs a contact-type sensor unit 50. Such a sensor unit 50 also has a rotating portion 51 provided at a shaft portion 31 of a shaft 30, and a signal output portion 55 provided at a housing 10 for outputting a signal corresponding to a phase of the rotating portion 51. FIG. 25 shows a cross section taken along a line XXV-XXV of FIG. 26.

The rotating portion 51 is, for example, a protrusion 513 provided at a tip of the shaft portion 31 in the pedal shaft direction DPa. On the other hand, the signal output portion 55 has, for example, a fixing portion 552 fixed to a housing 10 and a sensor portion 553 rotatably provided with respect to the fixing portion 552. The sensor portion 553 engages with the protrusion 513 provided on the shaft portion 31 of the shaft 30, and rotates together with the protrusion 513. An encoder, a potentiometer, or the like, for example, is employed as the signal output portion 55. The signal output portion 55 outputs a signal corresponding to the rotation angle of the sensor portion 553.

When the shaft 30 and a pedal pad 40 rotate, the rotation is transmitted from the protrusion 513 provided on the shaft portion 31 of the shaft 30 to the sensor portion 553, and the sensor portion 553 rotates. Therefore, the signal output portion 55 having the sensor portion 553 outputs an electric signal corresponding to the pedal rotation angle.

Due to the configuration of the sensor unit 50 as described above, in the present embodiment, it is possible to arrange the rotating portion 51 and the sensor portion 553 of the sensor unit 50 on the pedal shaft center line CL.

The present embodiment is similar to the first embodiment, except for the above-described aspects. Thus, the present embodiment can achieve the advantages obtained by the configuration in common with the first embodiment described above in a similar manner as in the first embodiment.

Tenth Embodiment

The tenth embodiment is described. The present embodiment also partially changes the configuration of the sensor unit 50 from the first embodiment, and the other parts are the same as the first embodiment.

Figure 27:
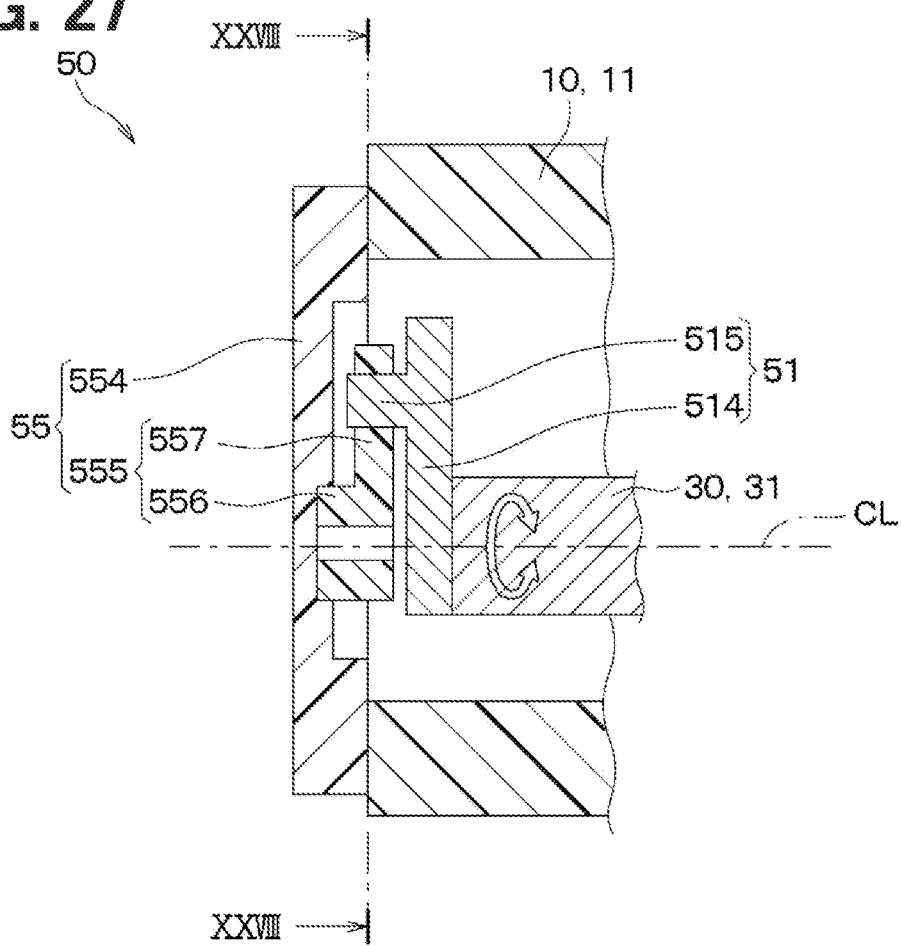
FIG. 27 is a cross-sectional view showing a sensor unit provided in a pedal device according to a tenth embodiment.
Figure 28:
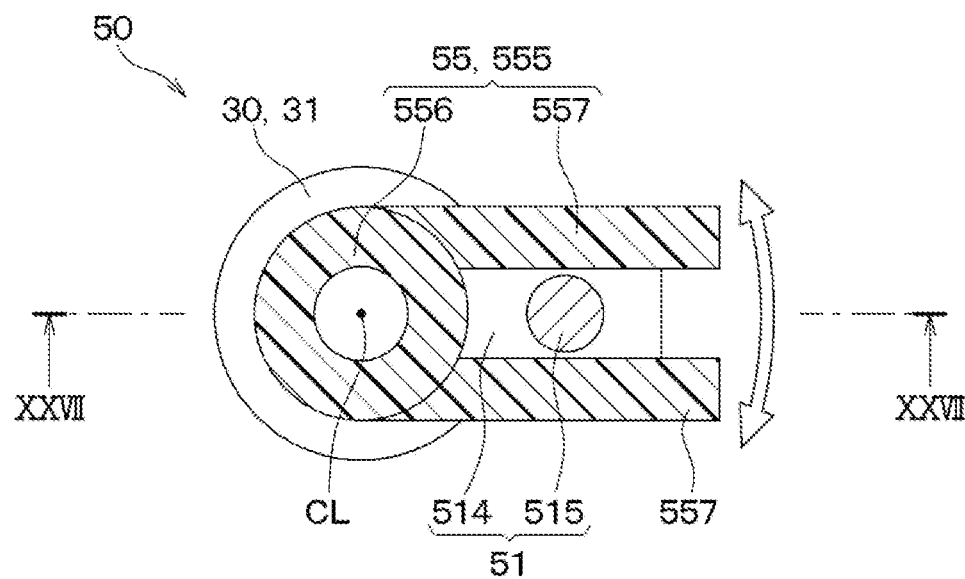
FIG. 28 is a cross-sectional view taken along a line XXVIII-XXVIII of FIG. 27.

As shown in FIGS. 27 and 28, a pedal device 1 of the present embodiment also employs a contact-type sensor unit 50. Such a sensor unit 50 includes a rotating portion 51 provided at a shaft portion 31 of a shaft 30, and a signal output portion 55 provided at a housing 10 for outputting a signal corresponding to the phase of the rotating portion 51. FIG. 27 shows a cross section taken along a line XXVII-XXVII of FIG. 28.

The rotating portion 51 includes, for example, an arm portion 514 extending radially outward from the shaft portion 31 of the shaft 30 and a protrusion portion 515 provided at the arm portion 514. On the other hand, as the signal output portion 55, for example, an encoder, a potentiometer, or the like is adopted. The signal output portion has, for example, a fixing portion 554 fixed to the housing 10 and a sensor portion 555 rotatably provided with respect to the fixing portion 554. Further, the sensor portion 555 is composed of a cylindrical portion 556 provided coaxially with the pedal shaft center line CL, and two engaging portions 557 extending radially outward from the cylindrical portion 556. The two engaging portions 557 forming the sensor portion 555 are fitted to the protrusion portion 515 forming the rotating portion 51, and rotate together with the protrusion portion 515. The signal output portion 55 outputs a signal corresponding to the rotation angle of the sensor portion 555.

When the shaft 30 and a pedal pad 40 rotate, the rotation is transmitted from the arm portion 514 and the protrusion portion 515 provided on the shaft portion 31 of the shaft 30 to the sensor portion 555, and the sensor portion 555 rotates. Therefore, the signal output portion 55 having the sensor portion 555 outputs an electric signal corresponding to the pedal rotation angle.

The present embodiment is similar to the first embodiment, except for the above-described aspects. Thus, the present embodiment can achieve the advantages obtained by the configuration in common with the first embodiment described above in a similar manner as in the first embodiment.

Eleventh Embodiment

The eleventh embodiment is described. The present embodiment also partially changes the configuration of a sensor unit 50 from the first embodiment, and the other parts are the same as the first embodiment.

Figure 29:
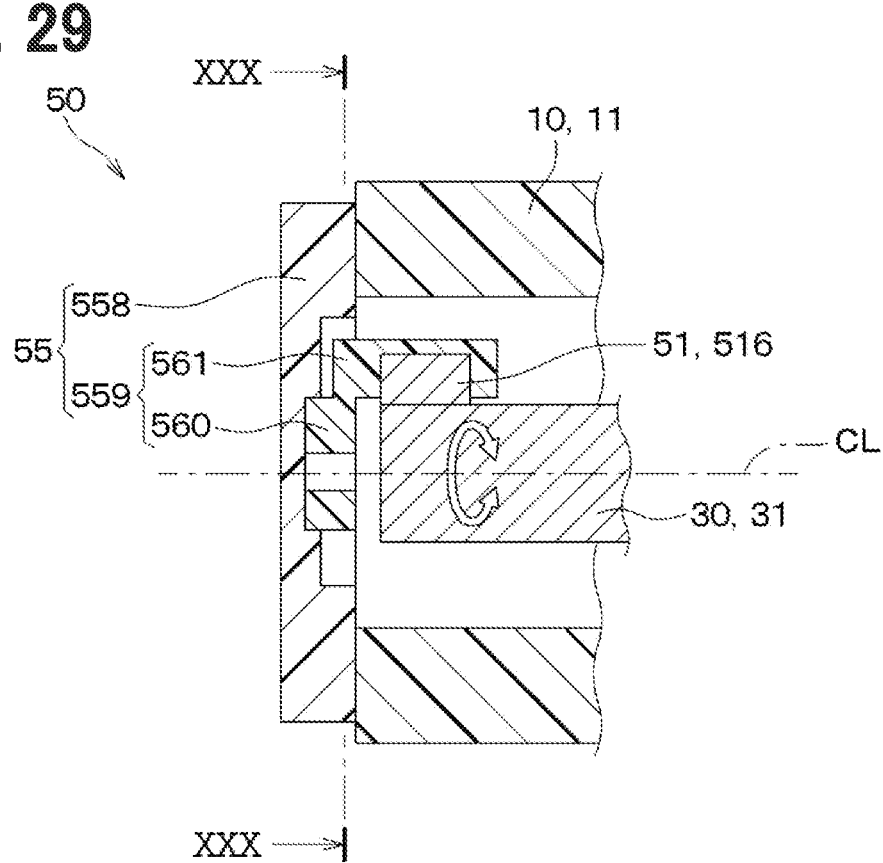
FIG. 29 is a cross-sectional view showing a sensor unit provided in a pedal device according to an eleventh embodiment.
Figure 30:
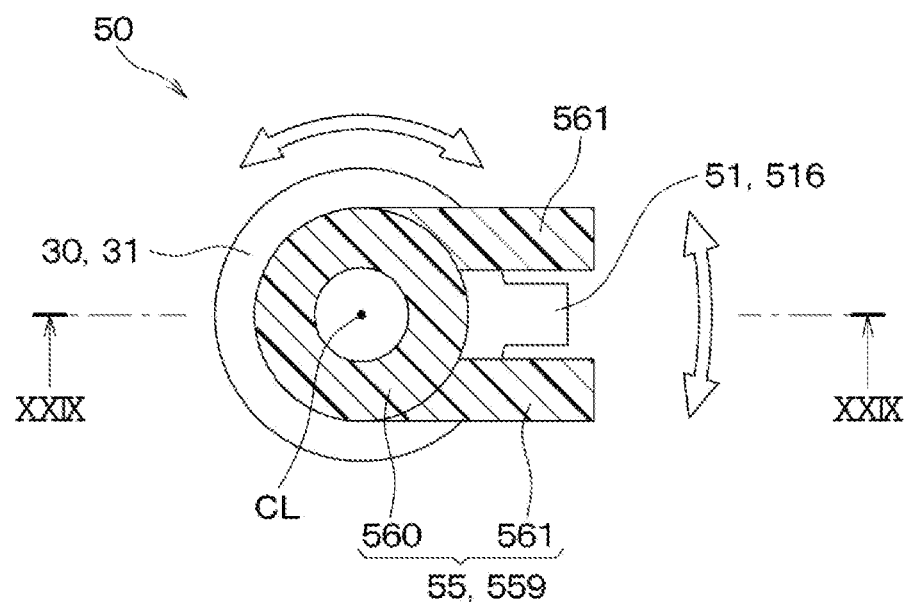
FIG. 30 is a cross-sectional view taken along a line XXX-XXX in FIG. 29.

As shown in FIGS. 29 and 30, a pedal device 1 of the present embodiment also employs a contact-type sensor unit 50. Such a sensor unit 50 also has a rotating portion 51 provided at a shaft portion 31 of a shaft 30, and a signal output portion 55 provided at a housing 10 for outputting a signal corresponding to the phase of the rotating portion 51. FIG. 29 shows a cross section taken along a line XXIX-XXIX of FIG. 30.

The rotating portion 51 is configured by, for example, a protrusion portion 516 projecting radially outward from the shaft portion 31 of the shaft 30. On the other hand, as the signal output portion 55, for example, an encoder, a potentiometer, or the like is adopted. The signal output portion 55 has, for example, a fixing portion 558 fixed to the housing 10 and a sensor portion 559 rotatably provided with respect to the fixing portion 558. The sensor portion 559 is composed of a cylindrical portion 560 provided coaxially with the pedal shaft center line CL, and two engaging portions 561 extending from an outer edge of the cylindrical portion 560 in parallel with the pedal shaft center line CL. The two engaging portions 561 forming the sensor portion 559 engage with the protrusion portion 516 of the rotating portion 51, and rotate together with the protrusion portion 516. The signal output portion 55 outputs a signal corresponding to the rotation angle of the sensor portion 559.

When the shaft 30 and the pedal pad 40 rotate, the rotation is transmitted from the protrusion portion 516 provided on the shaft portion 31 of the shaft 30 to the sensor portion 559, and the sensor portion 559 rotates. Therefore, the signal output portion 55 having the sensor portion 559 outputs an electric signal corresponding to the pedal rotation angle.

The present embodiment is similar to the first embodiment, except for the above-described aspects. Thus, the present embodiment can achieve the advantages obtained by the configuration in common with the first embodiment described above in a similar manner as in the first embodiment.

Twelfth Embodiment

The twelfth embodiment is described. The present embodiment is a modification of the first embodiment, and describes an example of a method of fixing a sensor unit 50 and a housing 10 together.

Figure 31:
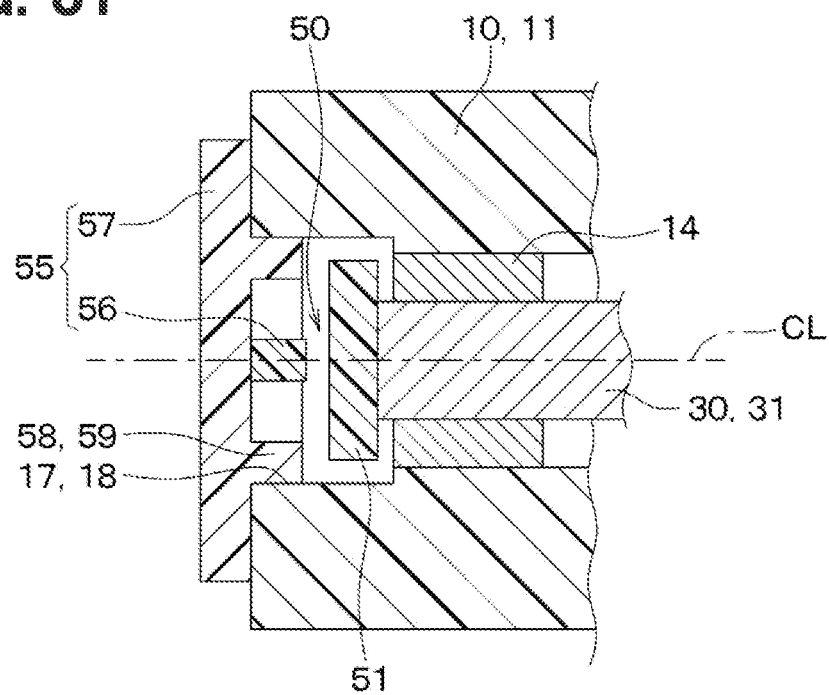
FIG. 31 is a cross-sectional view showing a sensor unit and its proximity provided in a pedal device according to a twelfth embodiment.

As shown in FIG. 31, in the present embodiment, a non-contact sensor is employed as the sensor unit 50 provided in the pedal device 1. The sensor unit 50 has a rotating portion 51 provided at a shaft portion 31 of a shaft 30, and a signal output portion 55 provided at a housing 10.

An opening 18 for installing the signal output portion 55 of the sensor unit 50 is provided in the housing 10 at a position corresponding to a tip portion of the shaft portion 31 of the shaft 30. On the other hand, a sensor holding portion 57 of a signal output portion 55 is provided with a protrusion 59 that engages with an inner wall surface of the opening 18 provided in the housing 10. The inner wall surface of the opening 18 provided in the housing 10 and the outer wall surface of the protrusion 59 provided in the sensor holding portion 57 of the signal output portion 55 constitute a positioning structure that allows the center of the sensor of the signal output portion 55 to be assembled at a predetermined position that enables detection of the phase of the rotating portion 51. The positioning structure enables the center of the sensor of the signal output portion 55 and the pedal shaft center line CL to be coaxially assembled. The configuration of the sensor unit 50 and the configuration of the positioning structure are not limited to those illustrated above, and various other configurations may also be adoptable.

The present embodiment is similar to the first embodiment, except for the above-described aspects. Thus, the present embodiment can achieve the advantages obtained by the configuration in common with the first embodiment described above in a similar manner as in the first embodiment.

Thirteenth Embodiment

The thirteenth embodiment is described. The present embodiment is a modification of the first embodiment, and describes an example of a method of fixing a sensor unit 50 and a housing 10 together.

Figure 32:
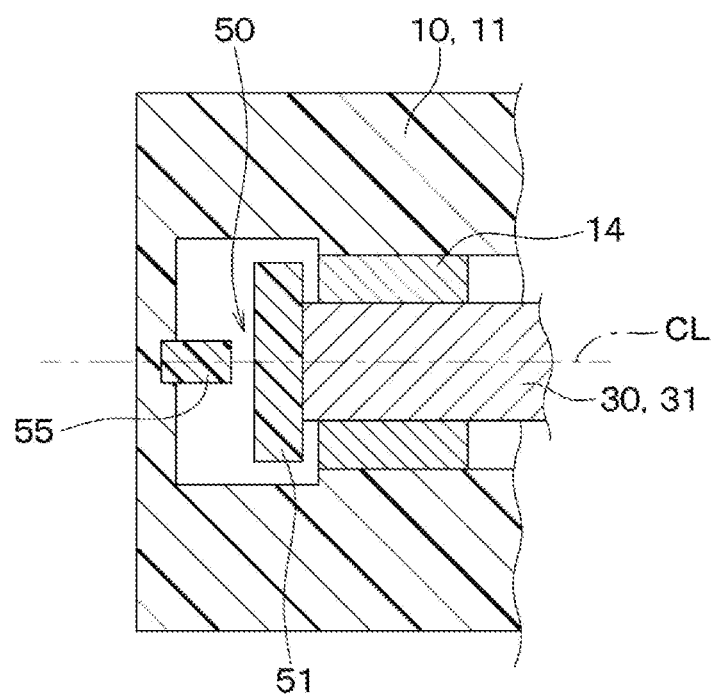
FIG. 32 is a cross-sectional view showing a sensor unit and its proximity provided in a pedal device according to a thirteenth embodiment.

As shown in FIG. 32, in the present embodiment, a non-contact sensor is employed as the sensor unit 50 provided in a pedal device 1. The sensor unit 50 has a rotating portion 51 provided at a shaft portion 31 of a shaft 30, and a signal output portion 55 provided at the housing 10.

The signal output portion 55 of the sensor unit 50 is fixed integrally with the housing 10 in a state in which a portion of the signal output portion 55 is embedded in the housing 10. A method of insert-molding the signal output portion 55 into the housing is exemplified as a method of embedding a portion of the signal output portion 55 in the housing 10. In such manner, the center of the sensor of the signal output portion is assembled at a predetermined position that enables detection of the phase of the rotating portion 51. In the present embodiment, the center of the sensor of the signal output portion 55 is assembled coaxially with the pedal shaft center line CL.

(1) With such a configuration, in the present embodiment, the configuration of the sensor unit 50 can be simplified, and the number of parts can be reduced, for example. Further, since variations in assembly of the signal output portion 55 with respect to the housing 10 are reduced, the center of the sensor of the signal output portion 55 is prevented from shifting away from a predetermined position (for example, on the pedal shaft center line CL) that enables detection of the phase of the rotating portion 51.

The present embodiment is similar to the first embodiment, except for the above-described aspects. Thus, the present embodiment can achieve the advantages obtained by the configuration in common with the first embodiment described above in a similar manner as in the first embodiment.

Fourteenth Embodiment

Figure 33:
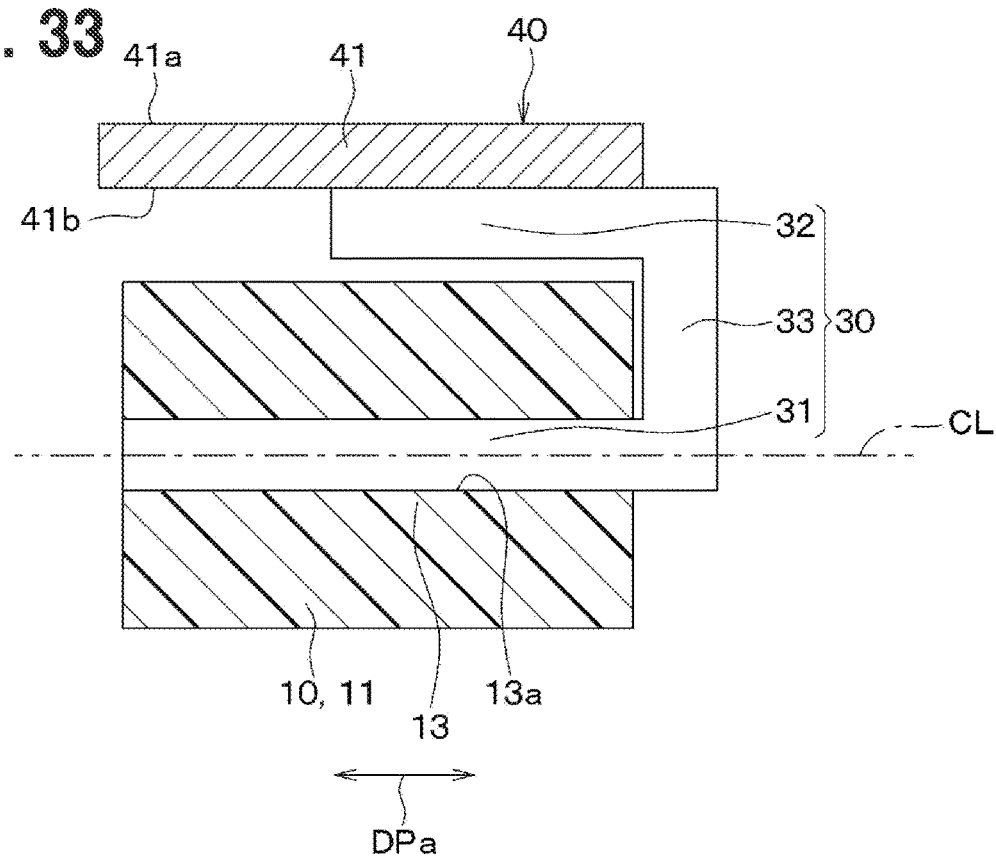
FIG. 33 is a cross-sectional view showing a shaft and its proximity provided in a pedal device according to a fourteenth embodiment.

The fourteenth embodiment is described. The present embodiment is a modification of the second embodiment. In the fourteenth embodiment, as shown in FIG. 33, the pedal shaft 35 (see FIG. 10) of the second embodiment is replaced with the shaft 30 similar to that of the first embodiment. It should be noted that a pedal pad 40 of the present embodiment does not have the pair of back surface projections 42 shown in FIG. 10.

Specifically, in the present embodiment, a shaft 30 has a shape obtained by bending a columnar metal bar, for example, multiple times. The shaft 30 has a shaft portion 31, a fixing portion 32 and a connecting portion 33. The shaft portion 31 is a pedal shaft centering on the pedal shaft center line CL and extending in the pedal shaft direction DPa, and is a portion arranged on a rotating shaft support portion 13. The fixing portion 32 is a portion that is non-rotatably fixed to the pedal pad 40. Specifically, the fixing portion 32 is fixed to a pedal back surface 40b of the pedal pad 40. The connecting portion 33 is a portion that connects the shaft portion 31 and the fixing portion 32.

Aside from the above-described aspects, the present embodiment is the same as the second embodiment. Further, in the present embodiment, effects similar to those of the second embodiment described above can be obtained in the same manner as in the second embodiment.

Fifteenth Embodiment

The fifteenth embodiment is described. The present embodiment is explained primarily with respect to portions different from those of the second embodiment.

Figure 34:
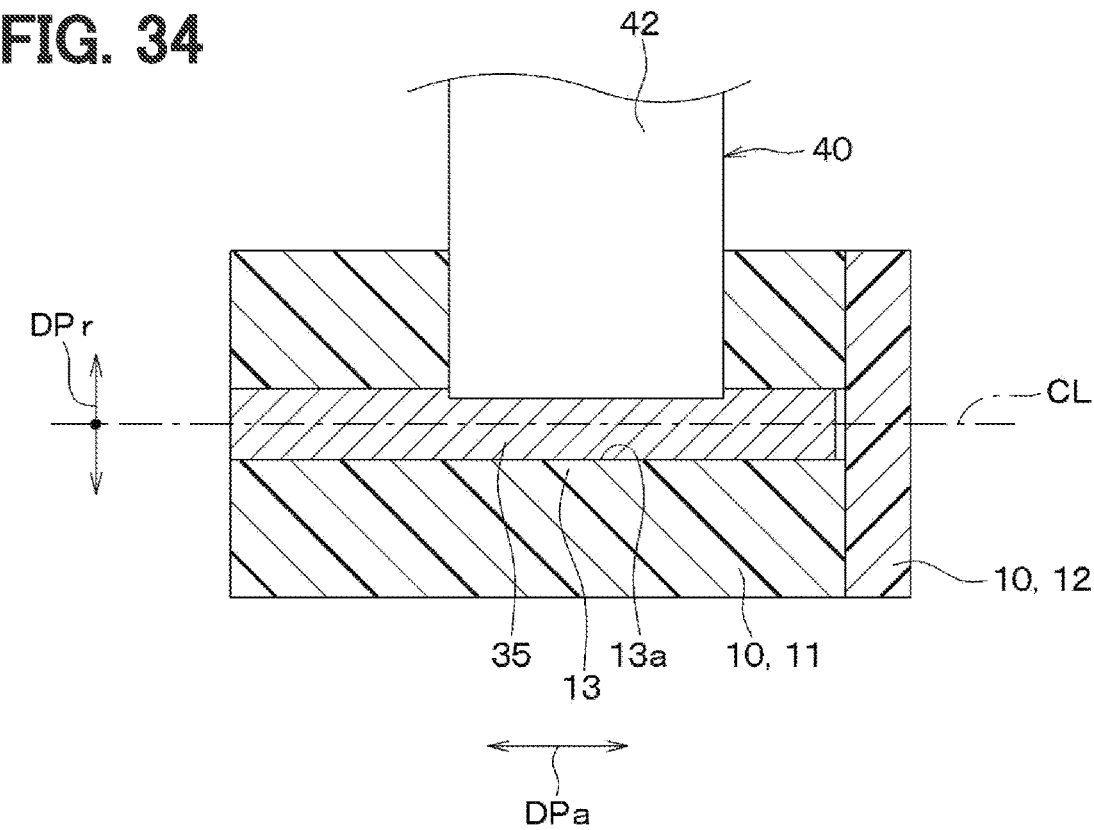
FIG. 34 is a cross-sectional view showing a pedal shaft and its proximity provided in a pedal device according to a fifteenth embodiment.

As shown in FIG. 34, a pedal pad 40 of the present embodiment has a single back surface projection 42 instead of a pair of projections. No insertion hole 421a is formed on the back surface projection 42, and the back surface projection 42 is joined to a pedal shaft 35 from outside in the radial direction. In such manner, the pedal pad 40 rotates integrally with the pedal shaft 35 about the pedal shaft center line CL.

The pedal shaft 35 slidably contacts an inner wall of the rotating shaft support portion 13 provided in a housing 10 and is supported directly in a rotatable manner. The pedal shaft 35 is supported only by the rotating shaft support portion 13 provided on the housing body 11 and is not supported by a housing cover 12.

Aside from the above-described aspects, the present embodiment is the same as the second embodiment. Further, in the present embodiment, effects similar to those of the second embodiment described above can be obtained in the same manner as in the second embodiment.

Sixteenth Embodiment

The sixteenth embodiment is described. The present embodiment is explained primarily with respect to portions different from those of the fifteenth embodiment.

Figure 35:
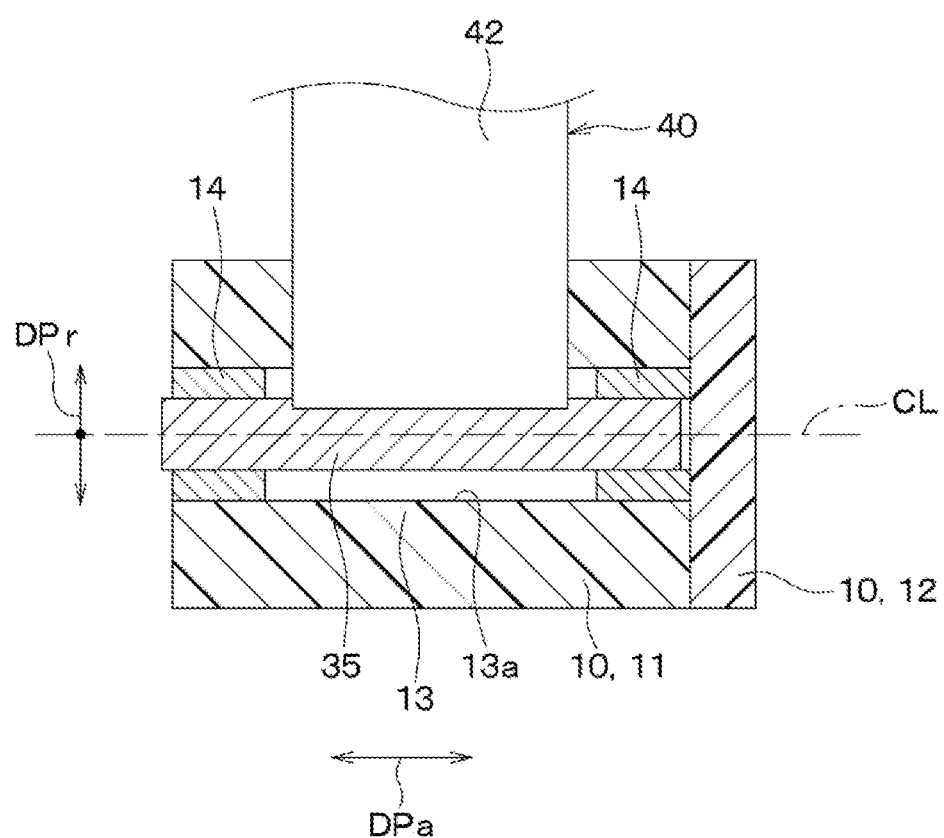
FIG. 35 is a cross-sectional view showing a pedal shaft and its proximity provided in a pedal device according to a sixteenth embodiment.

As shown in FIG. 35, in the present embodiment, a cylindrical bearing 14 is attached to a rotating shaft support portion 13 provided in a housing body 11. The center of the bearing 14 coincides with the pedal shaft center line CL. A pedal shaft 35 is rotatably supported by the bearing 14. Therefore, the pedal shaft 35 is rotatable about the center of the rotating shaft support portion 13 (that is, the center of the bearing 14). The pedal shaft 35 is supported only by the bearing 14 of the rotating shaft support portion 13 provided in the housing body 11 and is not supported by a housing cover 12.

By using the bearing 14 in such manner, it is possible to reduce wear of the rotating shaft support portion 13 and the pedal shaft 35. Therefore, the pedal shaft 35 can be maintained coaxially with respect to the center of the rotating shaft support portion 13 with high accuracy, so that the detection accuracy of the pedal rotation angle by using a sensor unit 50 can be enhanced.

Aside from the above described aspects, the present embodiment is the same as the fifteenth embodiment. Further, in the present embodiment, effects similar to those of the fifteenth embodiment described above can be obtained in the same manner as in the fifteenth embodiment.

Seventeenth Embodiment

The seventeenth embodiment is described. The present embodiment is similar to the first embodiment except that the base plate 20 shown in FIG. 4 is omitted from the first embodiment. Therefore, difference from the first embodiment is mainly described.

Figure 36:
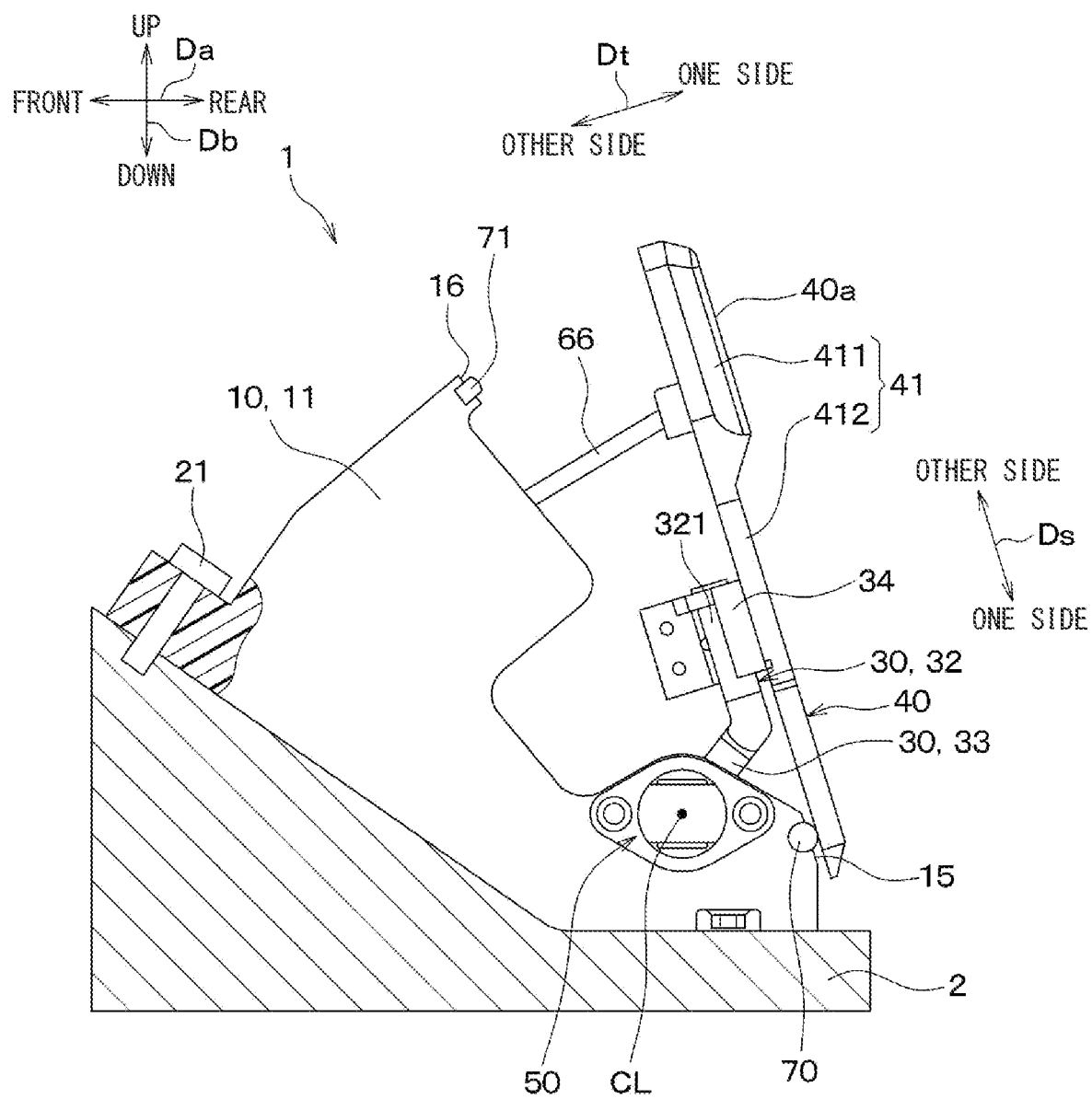
FIG. 36 is a side view showing a pedal device of a seventeenth embodiment, corresponding to FIG. 4.

As shown in FIG. 36, a pedal device 1 does not have the base plate 20 in the present embodiment. Therefore, a housing 10 provided in a pedal device 1 is directly attached to the floor 2 or the dash panel in the compartment of the vehicle 80 with bolts 21 or the like.

(1) Therefore, the pedaling force of the driver 81 acting on the housing 10 can be directly received by the floor 2 or the dash panel forming part of the vehicle body. Therefore, for example, mutual deformation between the housing 10 and parts assembled to the housing 10 is suppressible, and by extension, the detection accuracy of the pedal rotation angle by using a sensor unit 50 is improvable.

The present embodiment is similar to the first embodiment, except for the above-described aspects. Thus, the present embodiment can achieve the advantages obtained by the configuration in common with the first embodiment described above in a similar manner as in the first embodiment.

Eighteenth Embodiment

The eighteenth embodiment is described. The present embodiment is explained primarily with respect to portions different from those of the second embodiment.

Figure 37:
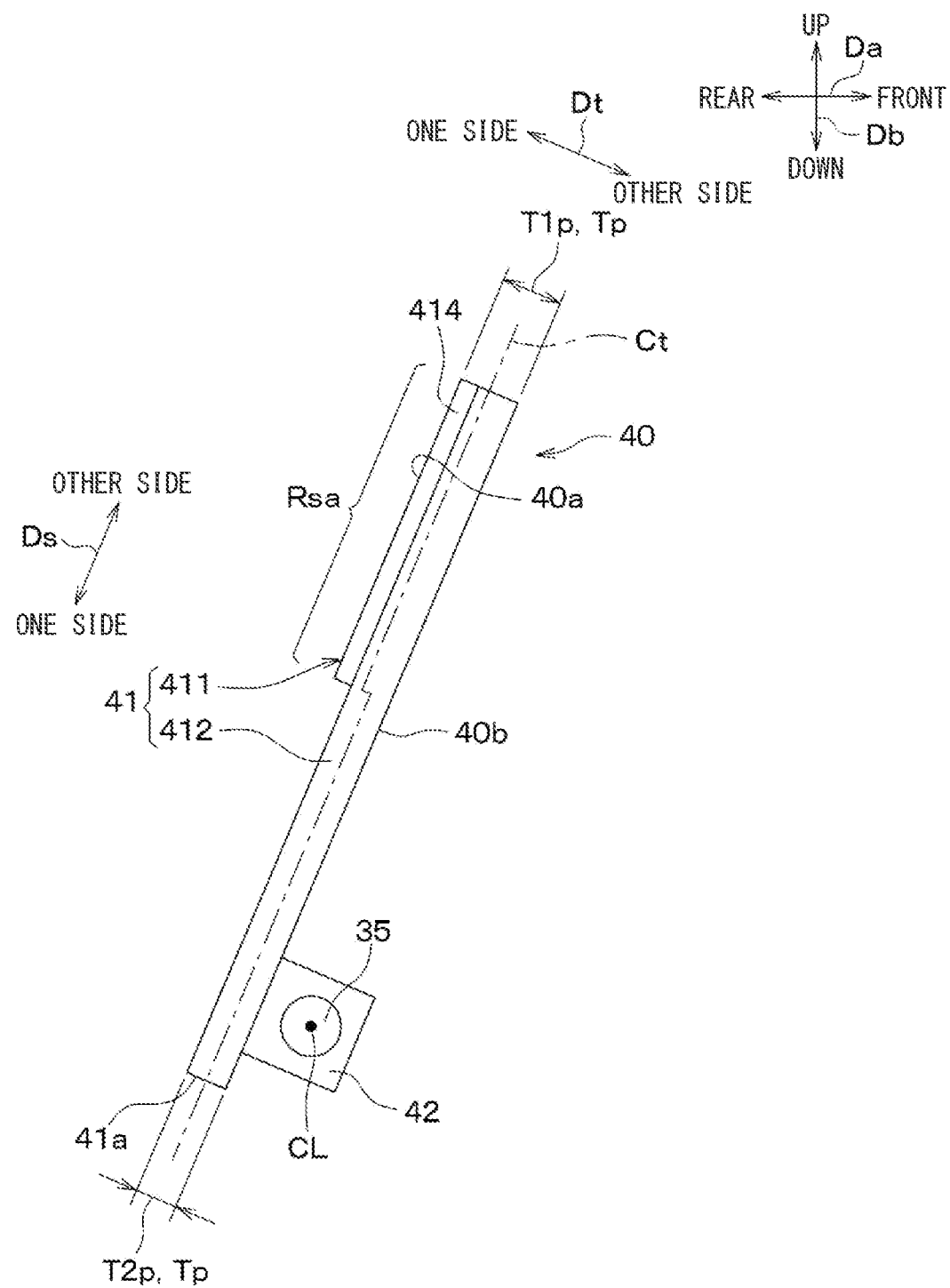
FIG. 37 is a schematic diagram showing a pedal pad and a pedal shaft when being viewed in the same direction as FIG. 8, according to an eighteenth embodiment.

As shown in FIG. 37, a pedal pad 40 has a sheet 414 in the present embodiment. The sheet 414 is attached to one side of a plate portion 41 of the pedal pad 40 in the pedal plate thickness direction Dt. The sheet 414 is, for example, a rubber sheet, and is provided at a position of the plate portion 41 biased toward the other side of the pedal extending direction Ds.

Since the plate portion 41 of the pedal pad 40 includes the sheet 414 and forms a plate shape, the sheet 414 constitutes a part of the plate portion 41 forming a plate shape. That is, the plate shape of the plate portion 41 is a shape including the sheet 414. Therefore, in the present embodiment, the thickness of the plate portion 41 of the pedal pad 40 is not constant, and the plate portion 41 includes a thick portion 411 and a thin portion 412 disposed on the one side of the thick portion 411 in the pedal extending direction Ds. The sheet 414 is provided in the thick portion 411 and not provided in the thin portion 412. The thickness T1$p$ of the thick portion 411 is greater than the thickness T2$p$ of the thin portion 412.

The present embodiment is the same as the first embodiment in that the plate portion 41 has the thick portion 411 and the thin portion 412. Therefore, the surface of the thick portion 411 on one side in the pedal plate thickness direction Dt, that is, the surface of the sheet 414 on one side in the pedal plate thickness direction Dt functions as a stepped surface 40$a$ of the pedal pad 40. The stepped surface 40$a$ is formed over the entire length of the sheet 414 in the pedal extending direction Ds, as indicated by a range Rsa. Note that in FIG. 37 as well as in FIG. 6, for example, the center of plate thickness Ct is represented by a one-dot chain line curved at a position between the thick portion 411 and the thin portion 412.

Aside from the above-described aspects, the present embodiment is the same as the second embodiment. Further, in the present embodiment, effects similar to those of the second embodiment described above can be obtained in the same manner as in the second embodiment.

Nineteenth Embodiment

The nineteenth embodiment is described. The present embodiment is explained primarily with respect to portions different from those of the second embodiment.

Figure 38:
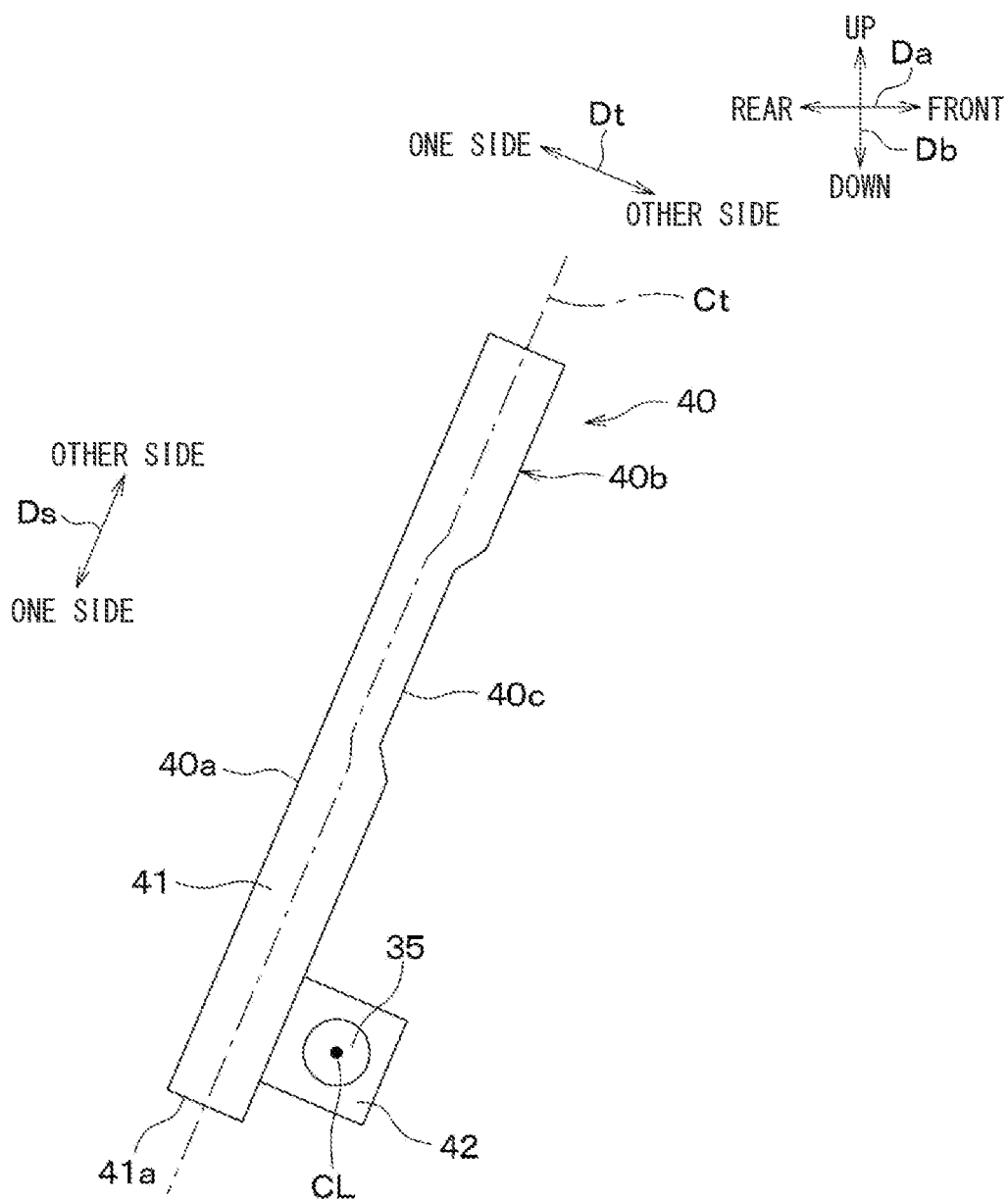
FIG. 38 is a schematic diagram showing a pedal pad and a pedal shaft, corresponding to FIG. 37, according to a nineteenth embodiment.

As shown in FIG. 38, in the present embodiment, a pedal back surface 40$b$ is partially recessed. Therefore, the pedal back surface 40$b$ has the bottom of the recess as a recessed bottom surface 40$c$. The recessed bottom surface 40$c$ corresponds to a portion of the pedal back surface 40$b$ that is positioned on the farthest one side in the pedal plate thickness direction Dt. The recessed bottom surface 40$c$ extends in the pedal extending direction Ds and also in the pedal shaft direction DPa (see FIG. 10), and is formed as a part of the plate shape outer surface of a plate portion 41. In the present embodiment, the entire pedal shaft 35 is provided on the other side in the pedal plate thickness direction Dt from the recessed bottom surface 40$c$.

Aside from the above-described aspects, the present embodiment is the same as the second embodiment. Further, in the present embodiment, effects similar to those of the second embodiment described above can be obtained in the same manner as in the second embodiment.

Other Embodiments (1) In each of the above-described embodiments, the pedal device 1 is used as a brake pedal device, but such a device is an example. For example, the pedal device 1 may be used as an accelerator pedal device operated to adjust the output of the driving power source of the vehicle 80. Furthermore, the pedal device 1 can be various devices operated by the driver 81 with his/her foot.

(2) In each of the above-described embodiments, as shown in FIG. 2, the pedal device 1 is a brake pedal device used in the brake-by-wire system 84, but such a device is an example. For example, the following configuration is acceptable, in which the vehicle 80 provided with the pedal device 1 does not employ the brake-by-wire system 84, and the pedal device 1 has a configuration in which the pedal pad 40 is mechanically connected to the master cylinder 866 provided in the brake circuit 86. In such a configuration, the pedal device 1 does not have to include the sensor unit 50.

(3) In each of the above-described embodiments, as shown in FIG. 6, the pedal device 1 includes the reaction force generating mechanism 60 having an elastic member, but such a device is an example. For example, when the pedal pad 40 is mechanically connected to the master cylinder 866 as described above, the pedal device 1 does not have to include the reaction force generating mechanism 60.

(4) In the above-described second embodiment, as shown in FIG. 9 and the pedal shaft 35 is fixed to the pair of back surface projections 42 of the pedal pad 40, and is rotatably supported by the rotating shaft support portion 13. However, such a configuration is merely an example. For example, conversely, the pedal shaft may be fixed to the rotating shaft support portion 13, and may be rotatably connected to the pair of back surface projections 42. The same also applies to the fifth embodiment.

(5) In the thirteenth embodiment described above, as shown in FIG. 32, a part of the signal output portion 55 of the sensor unit 50 is embedded in the housing 10. However, the entirety of the signal output portion 55 may be put in an embedded state in the housing 10.

(6) In the first embodiment described above, as an example of the positioning structure, engagement between the convex portion 58 of the signal output portion 55 and the concave portion 17 in the housing 10, as shown in FIG. 7, has been described, but the configuration is not limited to the above. The positioning structure may be, for example, a configuration in which a concave portion provided on the signal output portion 55 and a convex portion provided on the housing 10 are engaged. Various structures such as grooves or holes can be adopted as the concave portions, and various structures such as pins or ribs can be adopted as the convex portions.

(7) In the first embodiment described above, as shown in FIG. 2, the brake-by-wire system 84 causes the master cylinder 866 to generate hydraulic pressure in the brake fluid flowing through the brake circuit 86. However, the present disclosure is not limited to the above. The brake-by-wire system 84 may be configured to generate hydraulic pressure in the brake fluid flowing through the brake circuit 86 by, for example, a hydraulic pump.

(8) In the first embodiment described above, the ECU 85 of the brake-by-wire system 84 is composed of the first ECU 851 and the second ECU 852. However, the ECU 85 is not limited to the above, and may be composed of one or three or more ECUs.

(9) In the first embodiment described above, as shown in FIG. 7, the signal output portion 55 of the sensor unit 50 and the housing 10 have a positioning structure that enables the center of the sensor of the signal output portion 55 to be assembled at a predetermined position. Further, the positioning structure enables the center of the sensor of the signal output portion 55 and the pedal shaft center line CL to be coaxially assembled. However, such a configuration is merely an example. For example, when the signal output portion 55 is enabled to detect the phase of the rotating portion 51, the center of the sensor of the signal output portion 55 may be shifted away from the pedal shaft center line CL.

(10) In each of the above-described embodiments, as shown in FIG. 6, a support structure that supports the pedal pad 40 rotatably about the pedal shaft center line CL is specifically the housing 10. However, such a configuration is just an example. The support structure does not have to be formed as a housing that accommodates the reaction force generating mechanism 60 and the like.

(11) In the second embodiment described above, the plate portion 41 of the pedal pad 40 extends linearly as shown in FIGS. 8 and 9, which may also extend in a curved form. When the plate shape of the plate portion 41 is curved in such a manner, the one-dot chain line (see FIG. 9) indicating the center of plate thickness Ct is also curved in accordance with the plate shape.

(12) The present disclosure is not limited to the above-described embodiment, and can be implemented in various modifications. Each of the above embodiments, which are relevant to each other, is combinable to the other one unless such combination is clearly difficult.

Further, individual elements or features of a particular embodiment are not necessarily essential unless it is specifically stated that the elements or the features are essential in the foregoing description, or unless the elements or the features are obviously essential in principle. Furthermore, in each of the above embodiments, in the case where the number of the constituent element(s), the value, the amount, the range, and/or the like is specified, the present disclosure is not necessarily limited to the number of the constituent element(s), the value, the amount, and/or the like specified In the present embodiment unless the number of the constituent element(s), the value, the amount, and/or the like is indicated as indispensable or is obviously indispensable in view of the principle of the present disclosure. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

What is claimed is:
1. A pedal device, to be mounted on a vehicle, the pedal device comprising:
a pedal pad including a plate portion having a plate shape extending in a pedal extending direction and having a thickness in a plate thickness direction, wherein the pedal pad is rotatably movable about a pedal shaft center that is perpendicular to the pedal extending direction by a step-on operation of a driver to the plate portion from one side in the plate thickness direction;
a pedal shaft extending in an axial direction of the pedal shaft center;
a support body rotatably supporting the pedal pad via the pedal shaft for a rotation of the pedal pad about the pedal shaft center, wherein
the pedal shaft center is shifted away from a center of a plate thickness of the plate portion toward the other side in the plate thickness direction, the other side being an opposite to the one side in the plate thickness direction; and the pedal device further comprises a rotating shaft member that is provided with the pedal shaft, a fixing portion non-rotatably fixed to the pedal pad, and a connecting portion connecting the pedal shaft and the fixing portion.

2. The pedal device of claim 1, wherein
the plate shape of the plate portion has a back surface on the other side in the plate thickness direction, and
at least a part of the pedal shaft is provided on the other side in the plate thickness direction with respect to a portion of the back surface positioned on a farthest side in the plate thickness direction.

3. The pedal device of claim 1, wherein
the fixing portion has an extending portion extending in the pedal extension direction and fixed to the plate portion at a position on a side of an end portion of the plate portion more than the pedal shaft center in the pedal extending direction.

4. The pedal device of claim 1, wherein
the support body is configured as a housing having a housing body and a housing cover,
the housing body includes a rotating shaft support portion rotatably supporting the pedal shaft and having a rotating shaft hole into which the pedal shaft is inserted, and
the housing cover closes an opening of a space provided inside the housing body without supporting the pedal shaft.

5. The pedal device of claim 1, wherein
the support body is directly attached to a vehicle body.

6. The pedal device of claim 1, wherein the plate portion includes:
a thick portion having a stepped surface to be stepped on by the driver; and
a thin portion that is thinner than the thick portion.

7. A pedal device, to be mounted on a vehicle the pedal device comprising:
a pedal pad including a plate portion having a plate shape extending in a pedal extending direction and having a thickness in a plate thickness direction, wherein the pedal pad is rotatably movable about a pedal shaft center that is perpendicular to the pedal extending direction by a step-on operation of a driver to the plate portion from one side in the plate thickness direction;
a pedal shaft extending in an axial direction of the pedal shaft center; and
a support body rotatably supporting the pedal pad via the pedal shaft for a rotation of the pedal pad about the pedal shaft center, wherein
the pedal shaft center is shifted away from a center of a plate thickness of the plate portion toward the other side in the plate thickness direction, the other side being an opposite to the one side in the plate thickness direction,
the support body is configured as a housing having a housing body and a housing cover,
the housing body includes a rotating shaft support portion rotatably supporting the pedal shaft and having a rotating shaft hole into which the pedal shaft is inserted,
the housing cover closes an opening of a space provided inside the housing body without supporting the pedal shaft, and the pedal device further comprises a bearing provided in the rotating shaft hole and arranged at a position between the rotating shaft support portion and the pedal shaft.

8. The pedal device of claim 7, wherein the plate portion includes:
a thick portion having a stepped surface to be stepped on by the driver; and
a thin portion that is thinner than the thick portion.

9. A pedal device, to be mounted on a vehicle, the pedal device comprising:
a pedal pad including a plate portion having a plate shape extending in a pedal extending direction and having a thickness in a plate thickness direction, wherein the pedal pad is rotatably movable about a pedal shaft center that is perpendicular to the pedal extending direction by a step-on operation of a driver to the plate portion from one side in the plate thickness direction;
a pedal shaft extending in an axial direction of the pedal shaft center; and
a support body rotatably supporting the pedal pad via the pedal shaft for a rotation of the pedal pad about the pedal shaft center, wherein
the pedal shaft center is shifted away from a center of a plate thickness of the plate portion toward the other side in the plate thickness direction, the other side being an opposite to the one side in the plate thickness direction, and
the pedal device further comprises a sensor unit configured to detect a rotation angle of the pedal pad.

10. The pedal device of claim 9, wherein
the pedal shaft is configured to rotate integrally with the pedal pad, and
the sensor unit includes a rotating portion provided at the pedal shaft and a signal output portion provided at the support body to output a signal corresponding to a phase of the rotating portion.

11. The pedal device of claim 10, wherein
both of a rotation center of the rotating portion and a sensor center of the signal output portion are arranged coaxially on the pedal shaft center.

12. The pedal device of claim 10, wherein
the signal output portion and the support body are configured to have a positioning structure that allows the sensor center of the signal output portion to be assembled at a predetermined position where the phase of the rotating portion is detectable, and
the positioning structure includes a convex portion provided on one of the signal output portion or the support body, and a concave portion provided on an other one of the signal output portion or the support body to be engaged with the convex portion.

13. The pedal device of claim 10, wherein
the signal output portion and the support body are integrally fixed in a state where at least a part of the signal output portion is embedded in the support body.

14. The pedal device of claim 9, wherein
the sensor unit having a first portion and a second portion is a non-contact sensor in which the first portion and the second portion of the sensor unit move in a non-contact manner as the pedal pad rotates, to detect the rotation angle of the pedal pad.

15. The pedal device of claim 14, wherein
the first portion is configured to change a magnetic field around the second portion in accordance with a rotation of the pedal pad, and the second portion includes a Hall IC configured to output an electric signal according to the magnetic field around the second portion.

16. The pedal device of claim 9, wherein
the pedal device is a brake pedal device used in a brake-by-wire system in which a brake circuit generates a hydraulic pressure required for braking the vehicle by a drive control of an electronic control device based on the output signal of the sensor unit.

17. The pedal device of claim 9, wherein the plate portion includes:
a thick portion having a stepped surface to be stepped on by the driver; and
a thin portion that is thinner than the thick portion.

18. A pedal device, to be mounted on a vehicle, the pedal device comprising:
a pedal pad including a plate portion having a plate shape extending in a pedal extending direction and having a thickness in a plate thickness direction, wherein the pedal pad is rotatably movable about a pedal shaft center that is perpendicular to the pedal extending direction by a step-on operation of a driver to the plate portion from one side in the plate thickness direction;
a pedal shaft extending in an axial direction of the pedal shaft center; and
a support body rotatably supporting the pedal pad via the pedal shaft for a rotation of the pedal pad about the pedal shaft center, wherein
the pedal shaft center is shifted away from a center of a plate thickness of the plate portion toward the other side in the plate thickness direction, the other side being an opposite to the one side in the plate thickness direction,
the pedal pad has a hole forming portion having therein an insertion hole into which the pedal shaft is inserted, and
the hole forming portion is provided to have a minimum radial width that is a dimension along a radial direction from the insertion hole to a periphery of the hole forming portion, the plate portion has a predetermined portion that is positioned farther away from the pedal shaft than the minimum radial width of the hole forming portion, and the predetermined portion is positioned on a side of an end portion of the plate portion in the pedal extending direction more than the pedal shaft.

19. The pedal device of claim 18, wherein the plate portion includes:
a thick portion having a stepped surface to be stepped on by the driver; and
a thin portion that is thinner than the thick portion.

* * * * *